(12) United States Patent
Cuddeback et al.

(10) Patent No.: US 11,134,223 B2
(45) Date of Patent: *Sep. 28, 2021

(54) LOW-POWER RADIO FREQUENCY NETWORK FOR A SYSTEM OF CAMERAS

(71) Applicant: Non Typical, Inc., De Pere, WI (US)

(72) Inventors: Mark J. Cuddeback, Green Bay, WI (US); Jared Momose, Lewisberry, PA (US); James L. Higgins, N. Kingstown, RI (US)

(73) Assignee: NON TYPICAL, INC., De Pere, WI (US)

( * ) Notice: Subject to any disclaimer, the term of this patent is extended or adjusted under 35 U.S.C. 154(b) by 92 days.

This patent is subject to a terminal disclaimer.

(21) Appl. No.: 16/682,637

(22) Filed: Nov. 13, 2019

(65) Prior Publication Data

US 2020/0084418 A1 Mar. 12, 2020

Related U.S. Application Data

(63) Continuation of application No. 15/089,964, filed on Apr. 4, 2016, now Pat. No. 10,499,015.

(Continued)

(51) Int. Cl.
*H04W 52/02* (2009.01)
*H04W 56/00* (2009.01)
(Continued)

(52) U.S. Cl.
CPC ......... *H04N 7/181* (2013.01); *H04N 1/00106* (2013.01); *H04N 1/00315* (2013.01);
(Continued)

(58) Field of Classification Search
CPC ..... H04W 88/00; H04W 40/00; H04W 40/02; H04W 40/005; H04W 52/02; H04W 52/0203

See application file for complete search history.

(56) References Cited

U.S. PATENT DOCUMENTS 6,735,448 B1 5/2004 Krishnamurthy et al.
8,134,942 B2 * 3/2012 Messinger ............... H04Q 9/00
370/311

(Continued)

*Primary Examiner* — Kyle M Lotfi
(74) *Attorney, Agent, or Firm* — Michael Best & Friedrich LLP

(57) ABSTRACT

A system of cameras operable to transmit images over a short-range network and over a wide-area network. The system comprises a first camera including a first camera module including a first sensor for capturing a first image, and a first communication module programmed to transmit the first image through the short range network. The system further comprises a second camera including a second camera module including a second sensor for capturing a second image, and a second communication module programmed to receive the first image from the first communication module over the short range network. The second communication module is further programmed to transmit the first image through the wide area network. The system can further include a third camera including a third camera module having a third sensor for capturing a third image, and a third communication module programmed to transmit the third image through the short range network.

20 Claims, 15 Drawing Sheets

Related U.S. Application Data

(60) Provisional application No. 62/142,659, filed on Apr. 3, 2015.

(51) Int. Cl.
  *H04N 7/18* (2006.01)
  *H04N 1/00* (2006.01)
  *H04N 7/20* (2006.01)

(52) U.S. Cl.
  CPC ........ *H04N 1/00347* (2013.01); *H04N 7/185* (2013.01); *H04N 7/20* (2013.01); *H04W 52/02* (2013.01); *H04N 2201/0084* (2013.01); *Y02D 30/70* (2020.08)

(56) References Cited

U.S. PATENT DOCUMENTS

| | | |
|---|---|---|
| 9,706,756 B2 | 7/2017 | Swan |
| 2008/0148083 A1* | 6/2008 | Pesavento ............. G06F 1/3203 713/322 |
| 2015/0160711 A1* | 6/2015 | Zhu ....................... G06F 1/3209 713/323 |

* cited by examiner

LOW-POWER RADIO FREQUENCY NETWORK FOR A SYSTEM OF CAMERAS

RELATED APPLICATIONS

This application is a continuation of U.S. patent application Ser. No. 15/089,964, filed Apr. 4, 2016, which claims the benefit of U.S. Provisional Patent Application No. 62/142,659, filed Apr. 3, 2015, the entire contents of both of which are hereby incorporated by reference.

BACKGROUND

The present invention relates to a network of cameras.

SUMMARY

Systems of cameras, such as cameras that are deployed to monitor wildlife, hiking trails, biking trails, etc., are often spread over a considerable distance (e.g., miles). The distance between the cameras and the remote nature of their deployment can make the retrieval of images from the cameras quite burdensome. For example, a user may have to go to each individual camera, access a memory or memory card associated with each camera, and download the images from the memory to another device (e.g., a phone, computer, etc.) in order to determine if any images were captured (e.g., motion sensing can be used to only capture images when a person or wildlife is within range of the camera). If a user has to do this for each of dozens of cameras, the retrieval of the images can take a significant amount of time.

The invention described herein provides an optimized, low-power radio-frequency ("RF") network for transferring images from one camera to another camera in order to prevent a user from having to go, camera by camera, to retrieve images. The registration and synchronization of cameras within the network, as well as the manner in which messages and images are transferred through the network are optimized to limit power usage and maximize deployment flexibility. For example, remote cameras are typically battery powered devices. The cameras' battery power supplies would quickly be depleted if an inefficient wireless network protocol were used to transmit images. A number of existing network protocols (e.g., Bluetooth) produce effective networks but either require a significant amount of power to implement, require nodes acting as routers be powered to maintain routing tables, have high protocol overhead and administrative complexity, or are limited to the 2.4 GHz ISM band. Such networks are also not ideal for longer range transmissions or non-static networks (e.g., networks in which nodes are regularly moved or mobile or networks where new nodes are frequently added) or sleeping networks that can have a different topology on any given day (e.g., networks which spend the preponderance of their time in a power conserving state unable to receive RF messages). Additionally, these systems of cameras are often deployed by non-technical users, so simple but robust deployment and configuration is desirable.

A system of cameras operable to transmit images over a short range network (e.g., an RF network) and over a wide area network (e.g., a cellular network). The system comprises a first camera including a first camera module including a first sensor for capturing a first image of a first environment, and a first communication module programmed to transmit the first image through the short range network. The system further comprises a second camera including a second camera module including a second sensor for capturing a second image of a second environment, and a second communication module programmed to receive the first image from the first communication module over the short range network. The second communication module is further programmed to transmit the first image through the wide area network (e.g., for receipt by a smart phone, a tablet computer, a laptop computer, and/or a personal computer 155).

In one embodiment, the system of cameras further comprises a third camera including a third camera module including a third sensor for capturing a third image of a third environment, and a third communication module programmed to transmit the third image through the short range network. Preferably, the first communication module is further programmed to receive the third image from the third communication module over the short range network, and retransmit the third image through the short range network to the second communication module. The first communication module can be further programmed to transmit one or more squelch messages to other communication modules in the network to stop the other communication modules from further retransmitting the third image received by the first communication module. The second communication module can be programmed to receive the third image from the first communication module over the short range network, and transmit the third image through the wide area network.

Before any embodiments of the invention are explained in detail, it is to be understood that the invention is not limited in its application to the details of the configuration and arrangement of components set forth in the following description or illustrated in the accompanying drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components may be utilized to implement the invention. For example, "servers" and "computing devices" described in the specification can include one or more processing units, one or more computer-readable medium modules, one or more input/output interfaces, and various connections (e.g., a system bus) connecting the components.

Other aspects of the invention will become apparent by consideration of the detailed description and accompanying drawings.

DETAILED DESCRIPTION

Embodiments of the invention described herein are related to a low-power radio frequency ("RF") network for a system of cameras that allows for efficient transmission of captured images (e.g., thumbnail images) of an environment from one or more REMOTE cameras or nodes to a centralized HOME camera or node. The network includes a variety of power saving features to optimize the battery life of the REMOTE cameras while still effectively transmitting captured images through the network. The power saving features include network path optimization for message and data transmission, synchronization of the wake and sleep states for each node in the network, the transfer of images from a camera module to an RF module of a node during a sleep state, etc. The network is also configured or operable to be implemented in such a manner that nodes can be readily added or removed from the network with minimal user input and without sacrificing power savings or network message transmission efficiency. All of the power saving features of the network described herein can be employed together to maximize the power saving of the deployed network, or various combinations of the disclosed features can be used to achieve a desired level of power savings for the network as a whole and the individual devices within the network.

Figure 1:
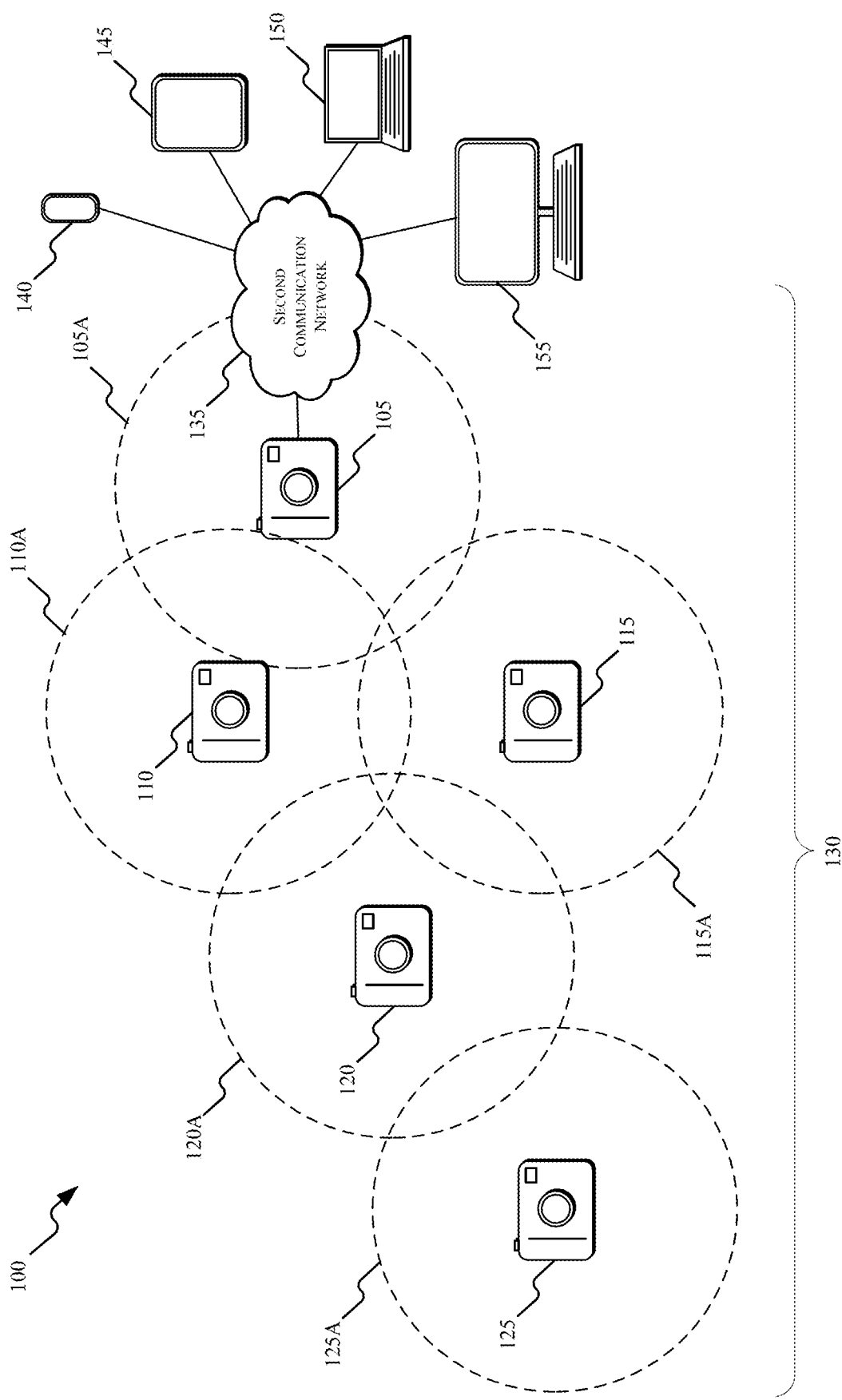
FIG. 1 illustrates a system of devices communicating over a first communication network and a second communication network according to an embodiment of the invention.

FIG. 1 illustrates a system 100 that includes, among other things, a plurality of remote cameras 105, 110, 115, 120, and 125, a first communication network 130, a second communication network 135, a smart phone 140, a tablet computer 145, a laptop computer 150, and a personal computer 155. The cameras 105-125 communicate over the first network 130, and each camera 105-125 includes a transmission range 105A, 110A, 115A, 120A, and 125A, respectively. The cameras 105-125 form nodes within the network 130 with the camera 105 being a HOME node and each of cameras 110-125 being a REMOTE node. Although five cameras or nodes are illustrated in FIG. 1, the system 100 and network 130 are capable of being implemented with more than five cameras or nodes. The transmission ranges 105A-125A dictate which of the cameras 105-125 are within transmission range of one another within the first network 130. The first network 130 is a short range wireless network using, for example, a low-power radio frequency ("RF") communication protocol to transmit messages and data throughout the system 100. In some embodiments, the first communication network 130 is a low-power wireless personal area network ("LP-WPAN") employing a mesh protocol (e.g., using an 868/915 MHz ISM band radio, such as the CC1121 low-power transceiver manufactured and sold by Texas Instruments). In alternative embodiments, the first network 130 is a short range wireless network that uses, for example, the ZigBee (IEEE 802.15.4 radio), Bluetooth Wi-Fi®, or similar protocol for communication.

Embodiments of the invention described herein are described with respect to the first network 130 being an LP-WPAN. The second communication network 135 is, for example, a wide-area or wide-area wireless communication network ("WAN") (e.g., a TCP/IP based network, a cellular network, such as, for example, a Global System for Mobile Communications ["GSM"] network, a General Packet Radio Service ["GPRS"] network, a Code Division Multiple Access ["CDMA"] network, an Evolution-Data Optimized ["EV-DO"] network, an Enhanced Data Rates for GSM Evolution ["EDGE"] network, a 3 GSM network, a 4 GSM network, a 4G network, a 4 GLTE network, a Digital Enhanced Cordless Telecommunications ["DECT"] network, a Digital AMPS ["IS-136/TDMA"] network, or an Integrated Digital Enhanced Network ["iDEN"] network, etc.). In some embodiments, the second communication network is a short range wireless network that uses, for example, the ZigBee (IEEE 802.15.4 radio), Bluetooth Wi-Fi®, or similar protocol for communication.

The smart phone 140, tablet computer 145, laptop computer 150, and the personal computer 155 are each operable to communicate with the camera 105 over the second network 135 to retrieve images stored in a memory of the camera 105.

Figure 2:
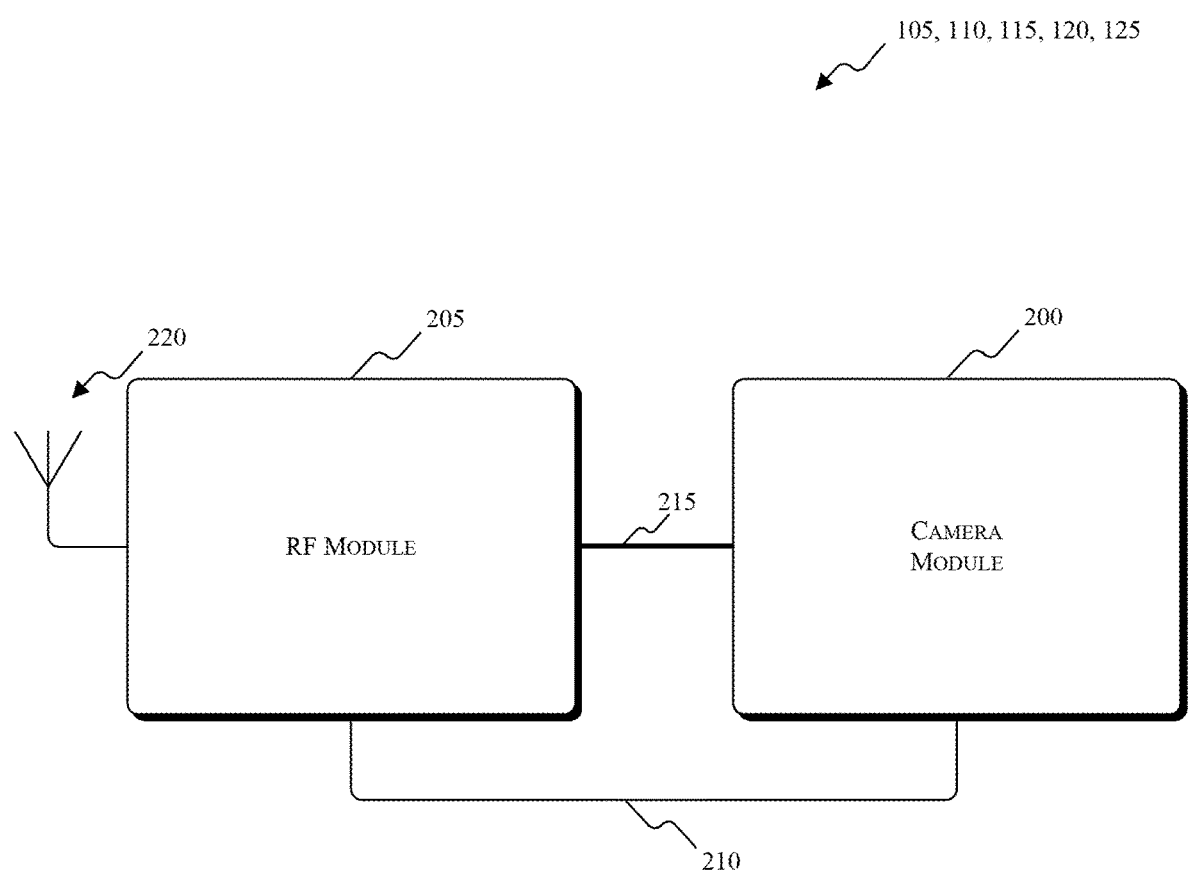
FIG. 2 illustrates a camera including a camera module and a radio frequency ("RF") module according to an embodiment of the invention.

FIG. 2 illustrates the cameras 105-125 in more detail. Each camera includes, among other things, a camera module 200, an RF module 205, a power connection 210 between the camera module 200 and the RF module 205, a communicative connection 215 between the camera module 200 and the RF module 205, and an antenna 220. In some embodiments, the communicative connection 215 between the camera module 200 and the RF module 205 is an inter-integrated circuit ("I2C") bus.

Figure 3:
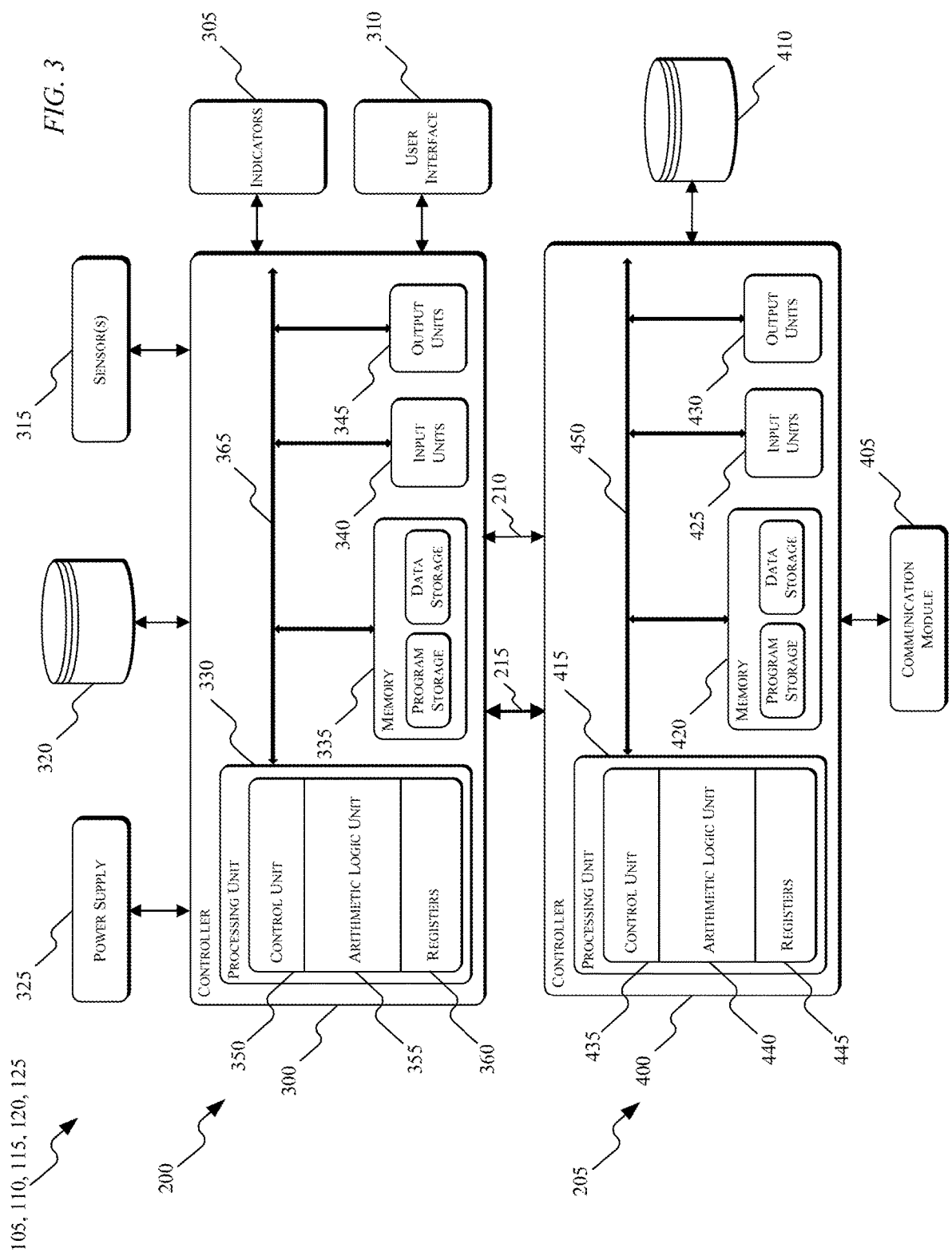
FIG. 3 illustrates the camera of FIG. 2 according to an embodiment of the invention.

FIG. 3 illustrates a controller 300 associated with a camera module 200 within the system 100. The controller 300 is electrically and/or communicatively connected to a variety of modules or components of the camera module 200. For example, the illustrated controller 300 is connected to one or more indicators 305, a user interface module 310, one or more sensors 315, a data store, database, or data structure 320, and a power supply module 325. The controller 300 includes combinations of hardware and software that are operable to, among other things, capture and store images using the sensors 315, activate one or more of the indicators 305, provide information about the status of the camera module 200 to a user using the user interface 310, retrieve images from the data store 320, etc. The one or more sensors 115 include, among other things, an infrared sensor, a charge-coupled device ("CCD").

In some embodiments, the controller 300 includes a plurality of electrical and electronic components that provide power, operational control, and protection to the components and modules within the controller 300 and/or the camera module 200. For example, the controller 300 includes, among other things, a processing unit 330 (e.g., a microprocessor or another suitable programmable device), a memory 335, input units 340, and output units 345. The processing unit 330 includes, among other things, a control unit 350, an arithmetic logic unit ("ALU") 355, and a plurality of registers 360 (shown as a group of registers in FIG. 3), and is implemented using a known computer architecture, such as a modified Harvard architecture, a von Neumann architecture, etc. The processing unit 330, the memory 335, the input units 340, and the output units 345, as well as the various modules connected to the controller 300 are connected by one or more control and/or data buses (e.g., common bus 365). The control and/or data buses 365 are shown generally in FIG. 3 for illustrative purposes. The use of one or more control and/or data buses for the interconnection between and communication among the various modules and components would be known to a person skilled in the art in view of the invention described herein. In some embodiments, the controller 300 is a microcontroller, is implemented partially or entirely on a semiconductor (e.g., a field-programmable gate array ["FPGA"] semiconductor) chip, is an application specific integrated circuit ("ASIC"), etc.

The memory 335 includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The processing unit 330 is connected to the memory 335 and executes software instructions that are capable of being stored in a RAM of the memory 335 (e.g., during execution), a ROM of the memory 335 (e.g., on a generally permanent basis), or another non-transitory computer readable medium such as another memory or a disc. Software included in the implementation of the camera module 200 can be stored in the memory 335 of the controller 300. The software includes, for example, firmware, one or more applications, program data, filters, rules, one or more program modules, and other executable instructions. The controller 300 is configured to retrieve from memory 335 and execute, among other things, instructions related to the control processes, methods, and communication protocols described herein. In other constructions, the controller 300 includes additional, fewer, or different components.

The power supply module 325 supplies a nominal DC voltage to the controller 300 or other components or modules of the camera module 200. The power supply module 325 is also configured to supply lower voltages to operate circuits and components within the controller 300 or camera module 200. In some embodiments, the controller 300 or other components and modules within the camera module 200 are powered by one or more batteries (e.g., 8 AA batteries), battery packs, or another portable or grid-independent power source (e.g., a solar panel, etc.).

The user interface module 310 is used to control or monitor the operation of the camera module 200. For example, the user interface module 310 is operably coupled to the controller 300 to control settings of the camera module, the retrieval of images, the configuration of the camera, etc. The user interface module 310 includes a combination of digital and analog input or output devices required to achieve a desired level of control and monitoring for the camera module 200. For example, the user interface module 310 includes a display and input devices such as touch-screen displays, a plurality of knobs, dials, switches, buttons, etc. The display is, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, etc. The user interface module 310 can also be configured to display conditions or data associated with the camera module in real-time or substantially real-time. For example, the user interface module 310 is configured to display network connection information, available memory, stored images, remaining battery capacity, etc. In some implementations, the user interface module 310 is controlled in conjunction with the one or more indicators 305 (e.g., LEDs, speakers, etc.) to provide visual or auditory indications of the status or conditions of the camera module 200 or camera.

FIG. 3 also illustrates a controller 400 associated with an RF module 205 within the system 100 and associated with a camera. The controller 400 is electrically and/or communicatively connected to a variety of modules or components of the RF module 205 or camera module 200 (e.g., the controller 400 communicates with the controller 300 over the communicative connection 215). For example, the illustrated controller 400 is connected to an RF communications module 405 and a data store, database, or data structure 410. The controller 400 includes combinations of hardware and software that are operable to, among other things, generate communication signals for transmission through the network 130, store images, receive communications signals over the network 130, transmit data through the network 130, transmit data through the network 135, etc.

In some embodiments, the controller 400 includes a plurality of electrical and electronic components that provide power, operational control, and protection to the components and modules within the controller 400 and/or the RF module 205. For example, the controller 400 includes, among other things, a processing unit 415 (e.g., a microprocessor or another suitable programmable device), a memory 420, input units 425, and output units 430. The processing unit 415 includes, among other things, a control unit 435, an ALU 440, and a plurality of registers 445 (shown as a group of registers in FIG. 3), and is implemented using a known computer architecture, such as a modified Harvard architecture, a von Neumann architecture, etc. The processing unit 415, the memory 420, the input units 425, and the output units 430, as well as the various modules connected to the controller 400 are connected by one or more control and/or data buses (e.g., common bus 450). The control and/or data buses 450 are shown generally in FIG. 3 for illustrative purposes. The use of one or more control and/or data buses for the interconnection between and communication among the various modules and components would be known to a person skilled in the art in view of the invention described herein. In some embodiments, the controller 300 is a microcontroller, is implemented partially or entirely on a semiconductor (e.g., a FPGA chip), is an ASIC, etc. In some embodiments, the controller 400 within the RF module 205 is a CC2538 system-on-chip microcontroller manufactured and sold by Texas Instruments.

The memory 420 includes, for example, a program storage area and a data storage area. The program storage area and the data storage area can include combinations of different types of memory, such as ROM, RAM (e.g., DRAM, SDRAM, etc.), EEPROM, flash memory, a hard disk, an SD card, or other suitable magnetic, optical, physical, or electronic memory devices. The processing unit 415 is connected to the memory 420 and executes software instructions that are capable of being stored in a RAM of the memory 420 (e.g., during execution), a ROM of the memory 420 (e.g., on a generally permanent basis), or another non-transitory computer readable medium such as another memory or a disc. Software included in the implementation of the RF module 205 can be stored in the memory 420 of the controller 400. The software includes, for example, firmware, one or more applications, program data, filters, rules, one or more program modules, and other executable instructions. The controller 400 is configured to retrieve from memory 420 and execute, among other things, instructions related to the control processes, methods, and communication protocols described herein. In some embodiments, the camera module 200 and RF module 205 include a single memory, rather than the two memories 335 and 420. In such embodiments, the single memory stores images from the camera module 200 that can then be retrieved by the RF module 205 and transmitted through the network 130. In other embodiments, the controller 400 includes additional, fewer, or different components.

The controller 400 and RF module 205 receive power over the power connection 210. In some embodiments, the RF module 205 includes a power supply module similar to the power supply module 325 that supplies DC voltage to the controller 300 or other components or modules of the camera module 200.

The communication module 405 is operably coupled to the controller 400 to receive information regarding images captured by the camera module 200 and transmits a signal (e.g., message) or data (e.g., an image) over the first network 130. In the illustrated embodiment, the communication module 405 performs wireless communication over the first communication network 130. As such, the illustrated communication module 405 includes a transceiver operable to send and receive messages and the antenna 220 to facilitate receipt and transmission of wireless messages and data. The communication module 405 may communicate privately or publicly over the network 130. In some embodiments, the communication module 405 also facilitates communication between a camera 105-125 and the second communication network 135. The communication module 405 can include one or more sub-modules (e.g., one sub-module for communicating with the first network 130 and a second sub-module for communicating with the second network 135, etc.). In some embodiments, one or more of the cameras 105-125 includes a separate communication module for communicating over the second network 135. In other embodiments, the communication module 405 communicates with the first network 130 or the second network 135 through a wired network connection. In some embodiments, the communication module 405 includes a range extender, such as the CC2591 range extender manufactured and sold by Texas Instruments.

In operation, a camera 105-125 captures images using the camera module 200. The camera module 200 transfers the images to the RF module 205, and the RF module 205 transmits the images through the network 130 to a HOME node or camera. The network 130 is optimized for the transfer of images in a lossy, low-bandwidth RF communication network that has significant power constraints. It is desirable to eliminate or mitigate manual network management of the network 130 even though the topology of the network 130 is not static. The configuration, deployment, and operation of the network 130 are described in more detail below.

Network Topology

A camera, and more specifically the RF module 205 of the camera, will either form a network or attempt to synchronize with an existing network. For example, if the mode of the RF module 205 is designated as HOME, the RF module 205 will form a new network and act as the HOME node within the network. If the mode of the RF module 205 is designated as REMOTE, the RF module 205 will attempt to synchronize with an existing network (e.g., network 130) and transfer images through the network.

The network that is formed by the HOME and REMOTE nodes supports a mesh topology. Therefore, a REMOTE node that is out of direct RF range of the HOME node can transfer images to the HOME node via one or more intermediate REMOTE nodes.

The basic mechanism employed to propagate messages across the mesh is a randomized re-broadcast. When an RF Module 205 receives a message it will set a randomized timer to re-broadcast the message. Assuming an original source message is rebroadcast by every RF module in the network then it has the highest probability to reach the intended network destination(s). Such a technique eliminates the need to maintain large routing tables in every node of the network, but uses more power and bandwidth, which is too inefficient for large image transfers between the REMOTE and HOME nodes. To accommodate large image transfers, where the messages are being unicast at the network layer between the REMOTE and HOME node, a few features are implemented in the network 130. First, if a node receives a message and knows the next hop for the intended network destination, then the node will generate and send a "squelch" message that prevents further rebroadcasts of that message by other nodes and establishes a route in the transmitter for subsequent messages being sent to that network destination. Second, when a node receives a message that should be rebroadcast it will bin and randomize the rebroadcast based on a received signal strength indication ("RSSI") of the received message. In some embodiments, three bins are used: near, ideal, and far. The purpose of the binning is to cause nodes that are an ideal range from the transmitter to rebroadcast first, those that are near rebroadcast second, and those that are far rebroadcast third. This allows messages to be reliably propagated across the network in as few hops as possible while favoring solid links (communicative connections) over marginal links. The combination of squelching and rebroadcast binning causes solid routes to be reliably discovered and established during an image transfer, and eliminates the full network rebroadcast of every image fragment by every node in the network for the majority of the image transfer. If an optimized path fails multiple times in succession during the file transfer, then the route in that REMOTE node is discarded and it will broadcast the message. The message can be subsequently squelched by a different REMOTE node and establish a new working path. In some embodiments, on every wake cycle, the HOME node also commands all the REMOTE nodes in the network to flush their routes, ensuring that potentially failed or invalid routes are discarded.

Network Nodes

In some embodiments, the system is capable of accommodating up to 32 cameras including the HOME node. The 32 cameras can be deployed in any manner. For example, a network may have all the Cameras deployed such that it takes 31 hops before a message from the Home node reaches the farthest node, or all the cameras could be within RF range of all the others. Typical deployments will likely be a mixture of some hops with groups of several nodes within RF range of each other. In other embodiments, the system is capable of accommodating more or fewer cameras or nodes. For example, in some embodiments 100 or more cameras can be implemented in the system 100, or 10 or fewer cameras can be implemented in the system 100. Those skilled in the art will recognize that the system can be scaled to fit the desired number of cameras for a given implementation, based on the bandwidth of the RF network, the size of the images, the desired battery longevity, and desired maximum latency to receive an image after it is taken by a REMOTE node, etc.

Modes of Operation

As previously indicated, the network 130 includes a HOME node and REMOTE nodes. In order to form an RF network and transfer images, the mode of one camera's RF module 205 must be set to HOME and the mode of one or more additional cameras' RF modules 205 must be set to REMOTE. The cameras in the network 130 will share an RF Channel, sub-channel, and RF speed setting in order to communicate images through the network.

The HOME node receives thumbnail images from all other cameras in the network. In some embodiments, only one HOME node is allowed per network 130. If a second HOME node is detected, the RF module will set a status flag to alert a user of the misconfiguration of the camera. With the exception of heartbeat messages, REMOTE nodes will not transmit messages through the network 130 unless directed to do so by a request from the HOME node.

Network State

The network 130 is either in the sleep mode (or state) or a wake mode (or state). When in the sleep state, the RF module 205 for each node is conserving battery power. This is the state in which the RF module 205 will spend most of its time. When in the wake state, the RF module 205 is actively participating in bidirectional RF communications with other nodes in the network 130. The network state is dictated by the RF module 205 of a camera and not the camera module 200.

Registration

The registration of a REMOTE node in a network allows the REMOTE node to acquire a unique registration identification ("ID") (e.g., from 1-31 for a 32 node network) that determines which bits in sync and status message correspond to its own state. Before a node is registered, it is unable to request an image transfer since it is unable to set appropriate status message bits.

If a node is not registered, the node waits for a sync message that requests status information from the REMOTE nodes. The REMOTE node will set a registration request bit in a status message and append its media access control ("MAC") address to the status message. When the HOME node receives the status message, the HOME node keeps the network in the wake state and notifies the REMOTE node that it may register. The HOME node will assign an unused registration ID to the REMOTE node and then, assuming there are no other pending operations, will send additional sync messages to put the network to sleep.

Network Synchronization

The HOME node synchronizes all messages within the network 130. There are two types of synchronization messages: heartbeats messages and application sync messages. Once a heartbeat message is received by a REMOTE node, it is considered synchronized with the network 130 and it is able to begin transmitting heartbeat messages and retransmitting application sync messages.

Heartbeat Messages

Heartbeat messages are transmitted by all nodes that are synchronized with the network 130. In some embodiments, heartbeat messages are transmitted on average of once every 5 seconds. The exact transmission time is randomized to minimize collisions with other Heartbeat messages transmitted by other nodes. Heartbeat messages are transmitted in both the sleep and wake states of the network. The heartbeat message contains a precision countdown time until the next wake state of the network. If the network is already in the wake state, the countdown timer is 0. When a REMOTE node is attempting to synchronize with a network, the node turns on its receiver for a period of time to be able to receive a heartbeat message. If a heartbeat message is received, the REMOTE node will transition to the synchronized state and begin transmitting heartbeat messages. If a heartbeat message is not received, the node enters a sleep state for a period to conserve battery power before once again attempting to synchronize.

Application Sync Messages

When in the wake state of the network, the HOME node transmits application sync messages that are propagated through the network 130 by all the synchronized REMOTE nodes. The application sync messages contain additional timing information for the REMOTE nodes that is used to ensure that all nodes in the network remain on for image transfers and other network operations as dictated by the HOME node. In some embodiments, absolute local time received from a cellular network, or another service on the second network 135 can also be propagated to all of the cameras in the RF network 130 so that all of the images taken will have the correct timestamp without the need for the user to manually configure the time on every camera individually. If a REMOTE node enters the wake state but does not receive an application sync message, the node transitions to an unsynchronized state and stops sending heartbeat messages. The node then attempts to again synchronize with the network 130.

Synchronization

The HOME node uses synchronization messages to propagate a current network time, wake duration, and sleep duration to the REMOTE nodes. Synchronization messages are also used to send flush route, status, and registration requests to REMOTE nodes. Synchronization messages are transmitted multiple times to ensure a high probability that all REMOTE nodes receive it.

After entering the wake state, the HOME node waits a settling time before sending the first synchronization message. The settling time accommodates for an amount of time drift experienced by REMOTE nodes that are many hops away from the HOME node. The first synchronization message commands the remote nodes to flush their routes. In some embodiments, the first synchronization message requests a REMOTE node to transmit a status message back to the HOME node.

Depending on the status of the REMOTE nodes, the HOME node determines if it should keep the network awake to perform a node registration or image transfer, or reenter the sleep state. In either case, the HOME node sends out multiple synchronization messages to ensure that the network 130 is prepared for the next action to be taken by the HOME node. When a registration or image transfer completes, the HOME node sends an additional synchronization message to cause the network to enter the sleep state. The HOME node causes the network to sleep for a relatively short period (e.g., approximately 1 minute) if there are nodes that require registration or image transfers. When the HOME node determines that all of the REMOTE nodes in the network are registered and have no pending image transfers, it commands the network to enter the sleep state for a relatively longer period of time (e.g., 1 to 2 hours) before checking again for REMOTE nodes. In some embodiments, the REMOTE nodes may take several images during the long sleep state, and the HOME node keeps receiving images from the remote nodes using the short sleep state until all the images have been transferred from all nodes.

Status Messages

The timing and behavior of status message within the network 130 is optimized to limit power use and increase efficiency. The goal of a status message is to allow all REMOTE nodes to reliably report to the HOME node whether it is registered and if it has a pending image to transfer. If the status message was treated as a simple message sent by each REMOTE node to the HOME node and each REMOTE node rebroadcasted the status message to every other node, a network storm would be created resulting in significant packet loss and power use.

Instead, REMOTE nodes transmit their status message according to a two-tiered system. The first tier is based on the time-to-live ("TTL") of a received synchronization message. The TTL indicates how many hops a REMOTE node is away from the HOME node. The further the REMOTE node is from the HOME node the earlier it will transmit its status message. Within each TTL level, the REMOTE node transmits its status message in a specific time slot based on a registration ID for the network. As REMOTE nodes closer to the HOME node receive status messages from REMOTE nodes further from the HOME node, they accumulate the status of the farther nodes into their own status messages, which are then sent when their transmit time slot arrives. Therefore, only one Status message is sent by each REMOTE node in a deterministic time-slotted manner. The accumulation of the status for all the REMOTE nodes in the network is reliably and efficiently communicated to the HOME node, which results in the final accumulation representing the status of all the nodes in the network 130.

Rf Channels

The network 130 can be set to one of a plurality of channels. In some embodiments, there are eight RF channels in the 915 MHz band that may be selected by a user. The channels are designated by the numbers 1-8. Selecting different channels allow users to avoid narrow band interference at some frequencies. For example, there could be another transmitter operating at the same frequency that causes the system 100 problems when transferring images through the network 130. In some embodiments, the system 100 is deployed in a rural and unpopulated area and the risk of interference is low. However, the use of RF channels is beneficial when multiple distinct networks are deployed with an overlapping geographic area, which can otherwise result in RF collision domains. By utilizing different RF channels, each network has its own bandwidth for image transfers and do not interfere with the other networks. In some embodiments, the HOME and REMOTE nodes can change RF channels in response to narrow band interference (e.g., frequency agility), or the HOME and REMOTE nodes constantly change channels in a predetermined pattern during normal communications (e.g., frequency hopping).

Rf Sub-Channels

The network 130 can also employ an RF sub-channel to further divide an RF channel among multiple networks. In some embodiments, a user can select a sub-channel between 1 and 16. The RF sub-channel allows a single RF channel to be divided among multiple distinct networks. However, the overall bandwidth of the channel is now shared among those networks employing different sub-channels.

RF Data Transmission Speed

An RF transmission speed of the network 130 can also be set by a user. In some embodiments, the RF transmission speed of the network is set to a value between approximately 50 Kbps and 200 Kbps. When operating at 50 Kbps, the RF sensitivity is improved enough that nodes can achieve approximately twice the point-to-point line-of-sight transmission distance as compared to the 200 Kbps transmission speed. However, power consumption is adversely impacted because most RF operations would take approximately 4 times as long. This additional power consumption can be mitigated by increasing the delay between wake states to check for images and reducing the size of the thumbnail images that are transferred through the network 130. In some embodiments, a wake state check interval of 2 hours allows for the transfer of at least approximately 5000 thumbnail images during a 3-4 month period using a power source of 8 AA cells in each camera.

Message Retransmissions and Timeouts

RF networks are inherently lossy. Therefore, request type operations performed between nodes in the network 130 use multiple retries or retransmissions with generous timeout periods in order to avoid retransmit race conditions caused by normal propagation latencies of a response.

Image Transfer Between Camera Module and Rf Module

The RF module of each camera communicates with the camera module of the camera over a communication bus (e.g., an I2C communication bus). The RF module is a slave device to the camera module on the bus with the camera module operating as the master device.

When images are transferred through the network 130, they are streamed from and to the memory of the RF module (i.e., independent of the camera module). When configured as a REMOTE node, the RF module indicates to the camera module that the memory of the RF module is available to receive an image. If the camera module has a thumbnail image waiting to be transferred to the HOME node, it transfers the image from the camera module's memory to the RF modules memory. Once the image is received, the RF module indicates to the camera module that it has a pending image transfer (to the HOME node) and will indicate to the HOME node that it has a pending image transfer. Once the REMOTE node successfully transfers the image to the HOME node, the HOME node indicates to its camera module that it has received an image and transfers the image from the memory of its RF module to the memory of the camera module. During the next wake state, the HOME node sends an image confirmation to the REMOTE node. It is at this point that the REMOTE node indicates to the camera module that the image transfer was successful and that its memory is ready to receive another image. The closed loop nature of the image transfer protocol ensures that only images successfully received by the HOME node will be marked as received by the REMOTE node. Any failure during an image transfer causes the REMOTE node to attempt to retransmit the same image again. All image transfers from the camera module to the RF module are synchronized to occur during the sleep state of the network 130 in order to prevent processing delays while the network is in the wake state. As a result, the network 130 is in a power saving state while images are being transferred between the camera module and the RF module.

Image Transfers Between Network Nodes

After receiving status updates from the REMOTE nodes, the HOME node knows which REMOTE nodes have a pending image transfer. The HOME node does not request a status update again until the REMOTE nodes have been given the opportunity to transfer images. As a result, the HOME node does not favor any particular node for image transfers. Rather, images are requested from nodes in a round robin-type fashion. The HOME node sends an image transfer start request to the next REMOTE node in its waiting list. If the REMOTE node has a pending image stored in the RF module's external memory, then it begins sending image fragments to the HOME node. In some embodiments, each image fragment contains at most 93 bytes of actual image data in each 127 byte RF frame.

As an illustrative example, the first image fragment includes the length of the image, the image's Fletcher checksum, and some other metadata. In some embodiments, the first fragment does not contain any image data. The following fragments will have 93 bytes of image data, except for the last fragment which may contain fewer than 93 bytes of image data. The REMOTE node paces the transmission of image fragments. The slow pacing of the first 32 image fragments is intended to allow the network 130 time to establish an optimized route between the Remote and Home nodes. The remaining image fragments are sent at a faster pace since once an optimized route is established, and the network 130 can efficiently propagate the fragments across the network 130. In some embodiments, the REMOTE node streams up to 256 image fragments to the HOME node before it waits for an image block acknowledgement.

If the HOME node has received all of the expected fragments for the current image block, the HOME node sends an image block acknowledgement with a zero length. The image block acknowledgement tells the REMOTE node that the entire block has been received and that it may begin sending fragments of the next image block. If the HOME node has not received all of the image fragments in the image block, the HOME node sends a non-zero image block acknowledgement which tells the REMOTE node the specific fragment numbers to retransmit. The REMOTE node retransmits only the missing fragments and again waits for an image block acknowledgement.

When the HOME node has received the entire image, it verifies the actual image Fletcher checksum with the expected value sent in image fragment 1. If the two values match, the HOME node transfers the image to its camera module during the next sleep state of the network 130. If the two values do not match, the HOME node sends synchronization messages and prepares the network 130 to transfer an image from the next REMOTE node in the waiting list.

When the HOME node has successfully transferred the REMOTE node's image from its RF module to its camera module, the HOME node sends an image confirmation message to the REMOTE node during the next wake cycle. Upon receiving the image confirmation message, the RF module indicates to the camera module that the image has been successfully received by the HOME node.

The network 130 of cameras as set forth above is described in greater detail with respect to FIGS. 4-11. FIGS. 4-11 provide signal flow or message flow diagrams that demonstrate how nodes within the network 130 register, synchronize, transfer images, etc. Each of FIGS. 4-11 is described with respect to, for example, a network that includes a HOME node and one or two REMOTE nodes. One skilled in the art, in view of the invention described herein, would understand how to employ the processes and techniques disclosed herein to networks that include additional nodes (e.g., 5 nodes, 32 nodes, etc.).

Registering an Unregistered Remote Node

Figure 4:
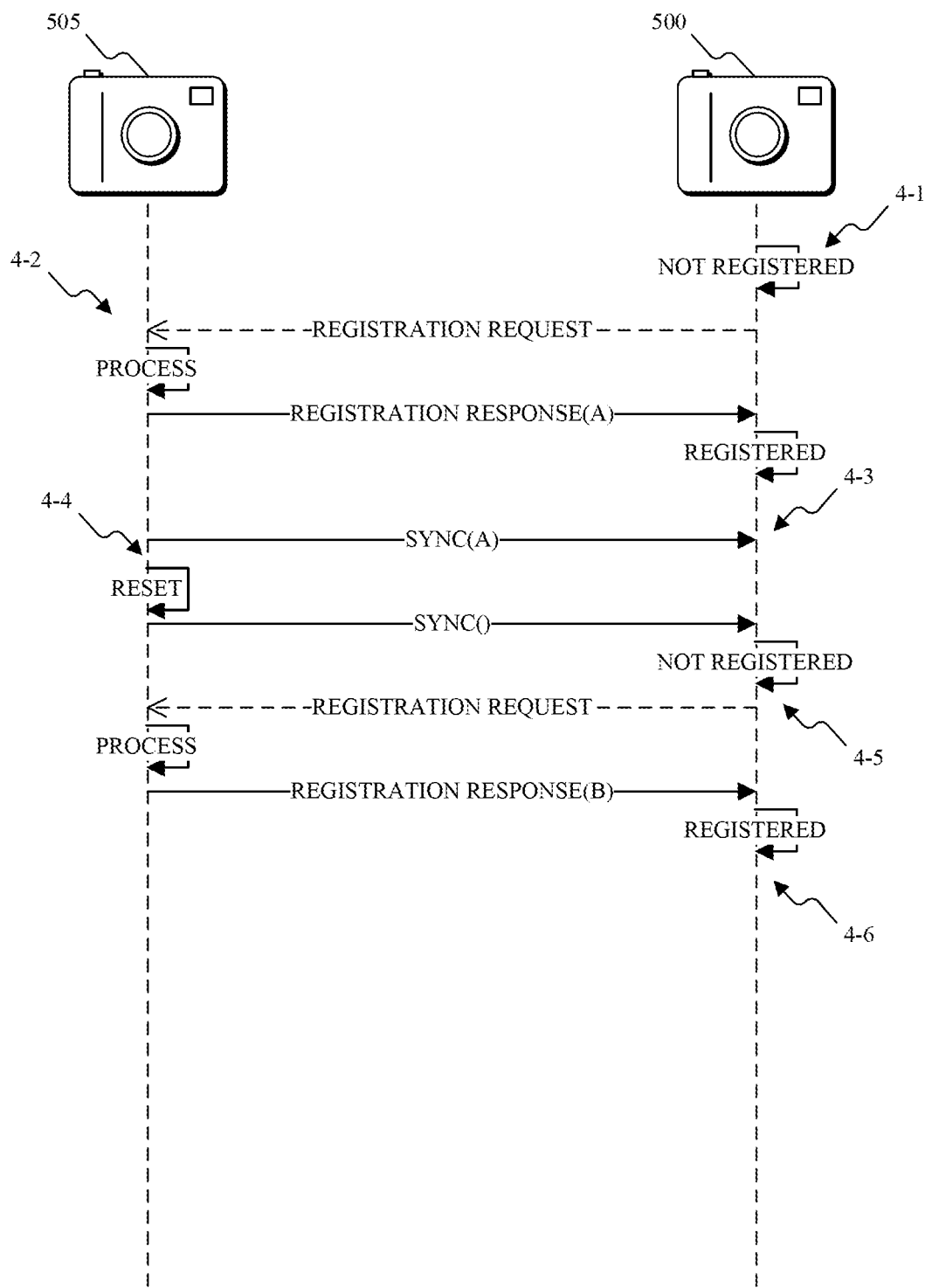
FIG. 4 illustrates messages transmitted between a HOME node and a REMOTE node to register a node in a network according to an embodiment of the invention.

The registration of an unregistered REMOTE node 500 with a HOME node 505 is illustrated in FIG. 4. The steps of the registration process and the messages that are transmitted between the HOME node 505 and the REMOTE node 500 are provided in FIG. 4. The registration process includes the following steps:

Step 4-1: All nodes need to be assigned a registration number which is used to optimize the messages being passed through the network and enables slotted transmission of status and heartbeat messages. Therefore, a REMOTE node requests a registration ID before it can participate in various network activities. The registration ID is not stored in non-volatile memory.

Step 4-2: If the HOME node already has previously assigned the REMOTE node an ID, then it will respond with the same ID, otherwise it will pick an unused ID. If all IDs are used, it reuses the ID that has not seen any network activity for the greatest amount of time. The HOME node does not store a registration ID table in non-volatile memory.

Step 4-3: Synchronization message indicates if there is a record of an ID being registered.

Step 4-4: HOME node resets and loses the registration table.

Step 4-5: HOME node does not have a registration for REMOTE node's ID.

Step 4-6: After reregistration, a REMOTE node's ID can be changed.

Synchronizing an Unsynchronized Node

Figure 5:
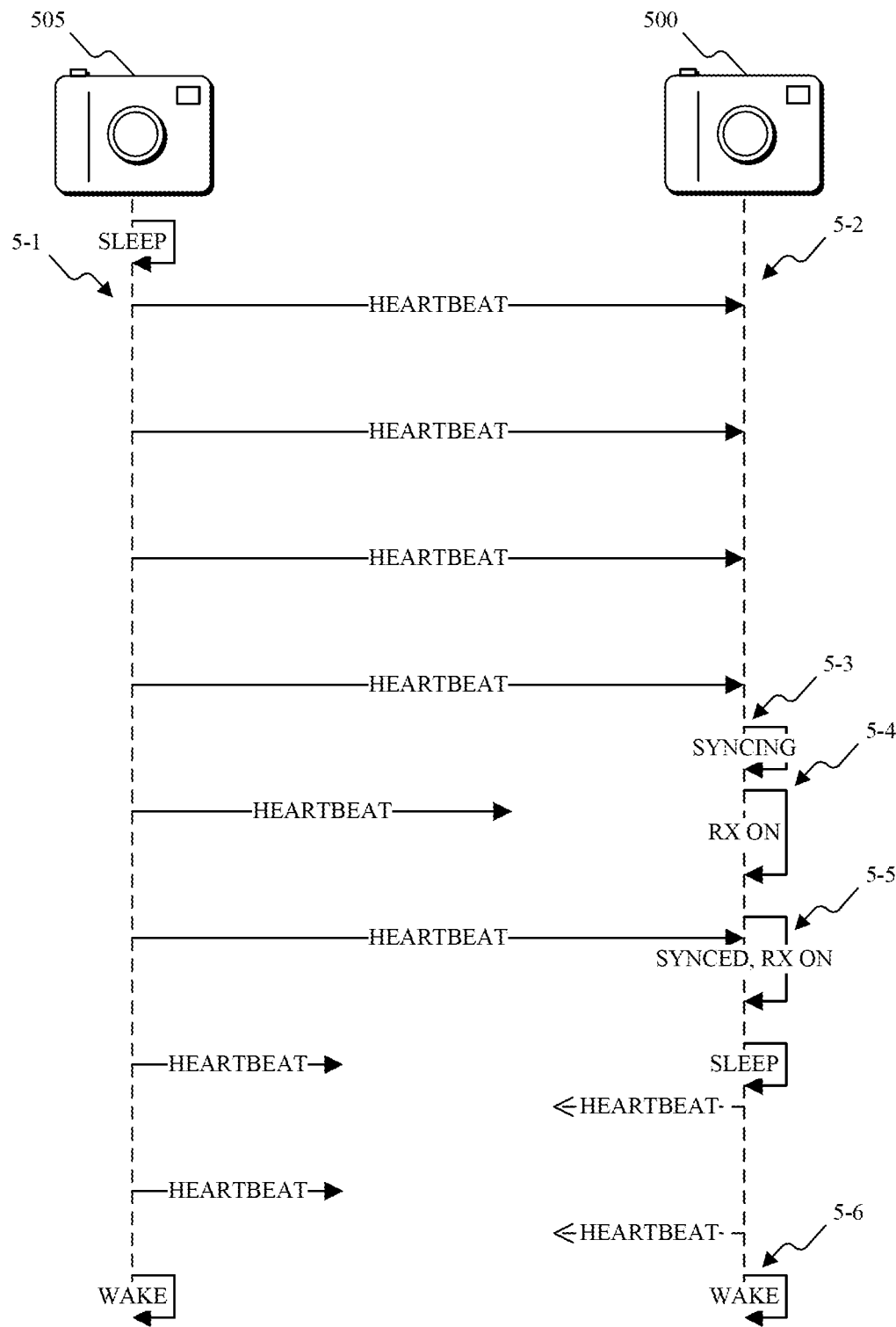
FIG. 5 illustrates messages transmitted between a HOME node and a REMOTE node to synchronize a node in a network according to an embodiment of the invention.

The synchronization of an unsynchronized REMOTE node 500 with a HOME node 505 is illustrated in FIG. 5. The steps of the synchronization process and the messages that are transmitted between the HOME node 505 and the REMOTE node 500 are provided in FIG. 5. The synchronization process includes the following steps:

Step 5-1: HOME and REMOTE nodes that are synchronized transmit a heartbeat message every Y seconds both during the sleep state and the wake state to allow for unsynchronized REMOTE nodes to quickly become synchronized.

Step 5-2: The network 130 is able to recover from events which might cause a communication blackout (e.g., a blizzard, rainfall, etc.). Re-synchronization is reasonably fast and uses approximately the same amount of power as if the network was synchronized.

Step 5-3: This REMOTE node has determined that it has to re-synchronize with the network 130.

Step 5-4: Every X minutes, the REMOTE node turns its RF module on for at least Y seconds to be available to receive a heartbeat message.

Step 5-5: A heartbeat message is received that indicates the time until the next wake state. RF module is turned off and REMOTE node schedules itself to enter the wake state with the rest of the network 130. The REMOTE node also sends heartbeat messages for other unsynchronized REMOTE nodes.

Step 5-6: REMOTE node now enters wake state with the rest of the network 130.

Determining Status of Remote Nodes (no Image to Transfer)

Figure 6:
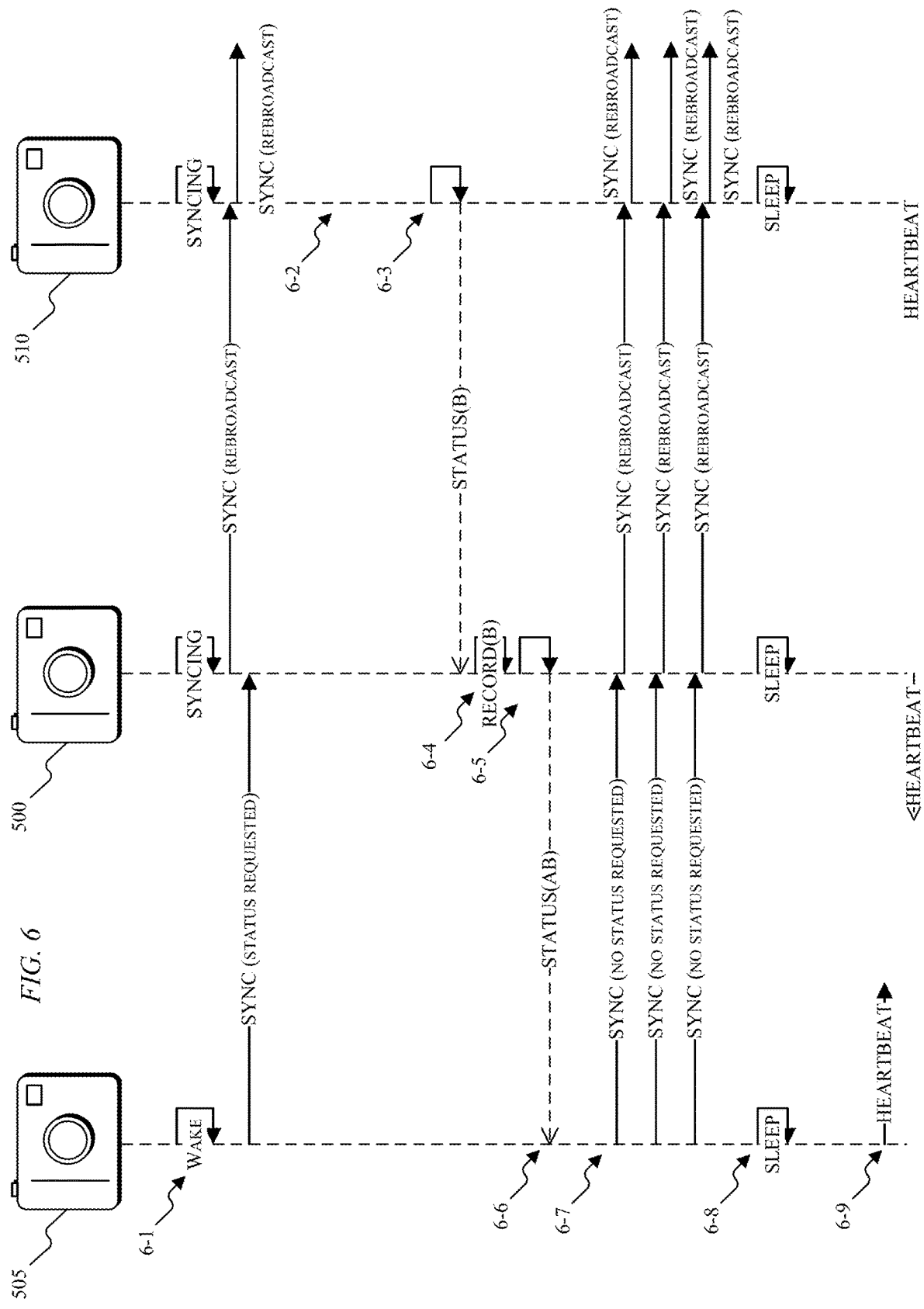
FIG. 6 illustrates messages transmitted between a HOME node and one or more REMOTE nodes to determine a status of the one or more REMOTE nodes in a network according to an embodiment of the invention.

The steps associated with determining the status of REMOTE nodes and the messages that are transmitted between the HOME node 505 and the REMOTE nodes 500 and 510 are provided in FIG. 6. Determining the status of the REMOTE nodes includes the following steps:

Step 6-1: The first synchronization message after entering the wake state requests that REMOTE nodes report their status back to the HOME node.

Step 6-2: REMOTE nodes at deeper levels from the HOME node are allowed to transmit their status messages first based on a slotted time mechanism. This allows REMOTE nodes closer to the HOME node to accumulate information from the outer REMOTE nodes and forward to HOME node with a minimal number of transmissions possible.

Step 6-3: Based on the level and the registration ID, this REMOTE node transmits its status indicating that it is synchronized, but that it does not have an image to transfer.

Step 6-4: This REMOTE node receives the status message and saves it for later transmission.

Step 6-5: Based on network level and registration ID, this REMOTE node transmits its status message, which includes its status and the status of the other REMOTE node.

Step 6-6: The HOME node now knows that REMOTE nodes A and B are synchronized and do not have an image to transfer.

Step 6-7: The HOME node makes sure that the REMOTE nodes know the synchronization information by transmitting it several times to account for potential packet loss.

Step 6-8: The network 130 is synchronized and goes to sleep at the same time.

Step 6-9: Each node sends heartbeat messages so that un-synchronized REMOTE nodes can quickly regain synchronization.

Determining Status of Remote Nodes (Image to Transfer)

Figure 7:
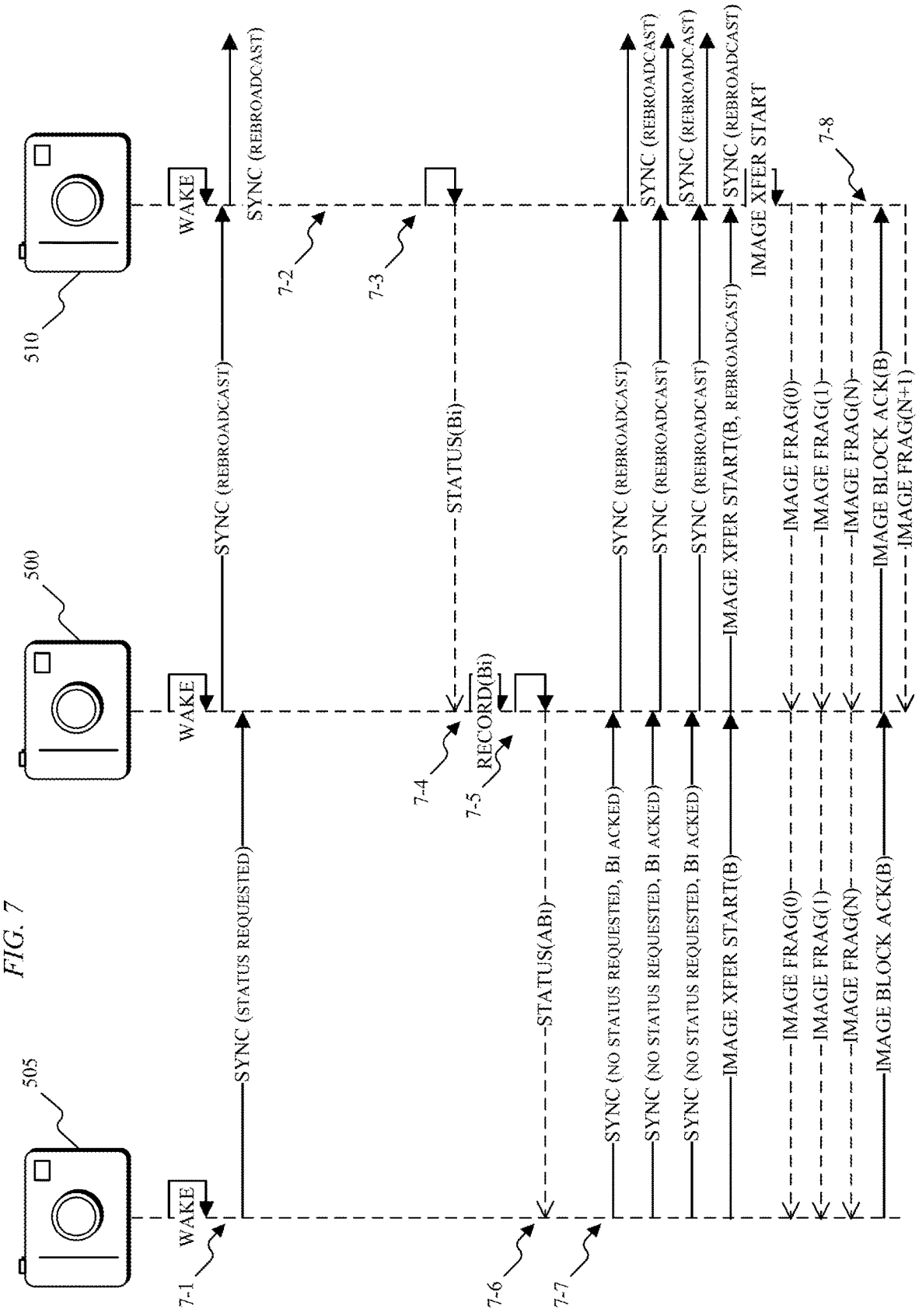
FIG. 7 illustrates messages transmitted between a HOME node and one or more REMOTE nodes to determine a status of and transmit an image from the one or more REMOTE nodes in a network according to an embodiment of the invention.

The steps associated with determining the status of REMOTE nodes when there are one or more images to transfer and the messages that are transmitted between the HOME node 505 and the REMOTE nodes 500 and 510 are provided in FIG. 7. Determining the status of the REMOTE nodes and transferring an image includes the following steps:

Step 7-1: The first synchronization message after entering the wake state requests that REMOTE nodes report their status back to the HOME node.

Step 7-2: REMOTE nodes at deeper levels from the HOME node are allowed to transmit their status messages first based on a slotted time mechanism, which allows REMOTE nodes closer to the HOME node to accumulate information from the outer nodes and forward the information to the HOME node with a minimal number of transmissions.

Step 7-3: Based on network level and registration ID, this REMOTE node transmits its status indicating that it is synchronized and has an image to transfer.

Step 7-4: This REMOTE node receives the status message and saves it for later transmission.

Step 7-5: Based on network level and registration ID, this REMOTE node transmits its status message, which includes its status and the status of the other REMOTE node.

Step 7-6: The HOME node now knows that REMOTE nodes 500 and 510 are synchronized and that REMOTE node 510 has an image to transfer.

Step 7-7: Now the HOME node ensures that the REMOTE nodes know the synchronization information by transmitting a synchronization message several times to account for potential packet loss. Because an image transfer is required, the HOME node extends the wake state.

Step 7-8: The REMOTE node transfers a block of fragments and waits for a block acknowledgment.

Transfer of Images from Remote Node to Home Node

Figure 8:
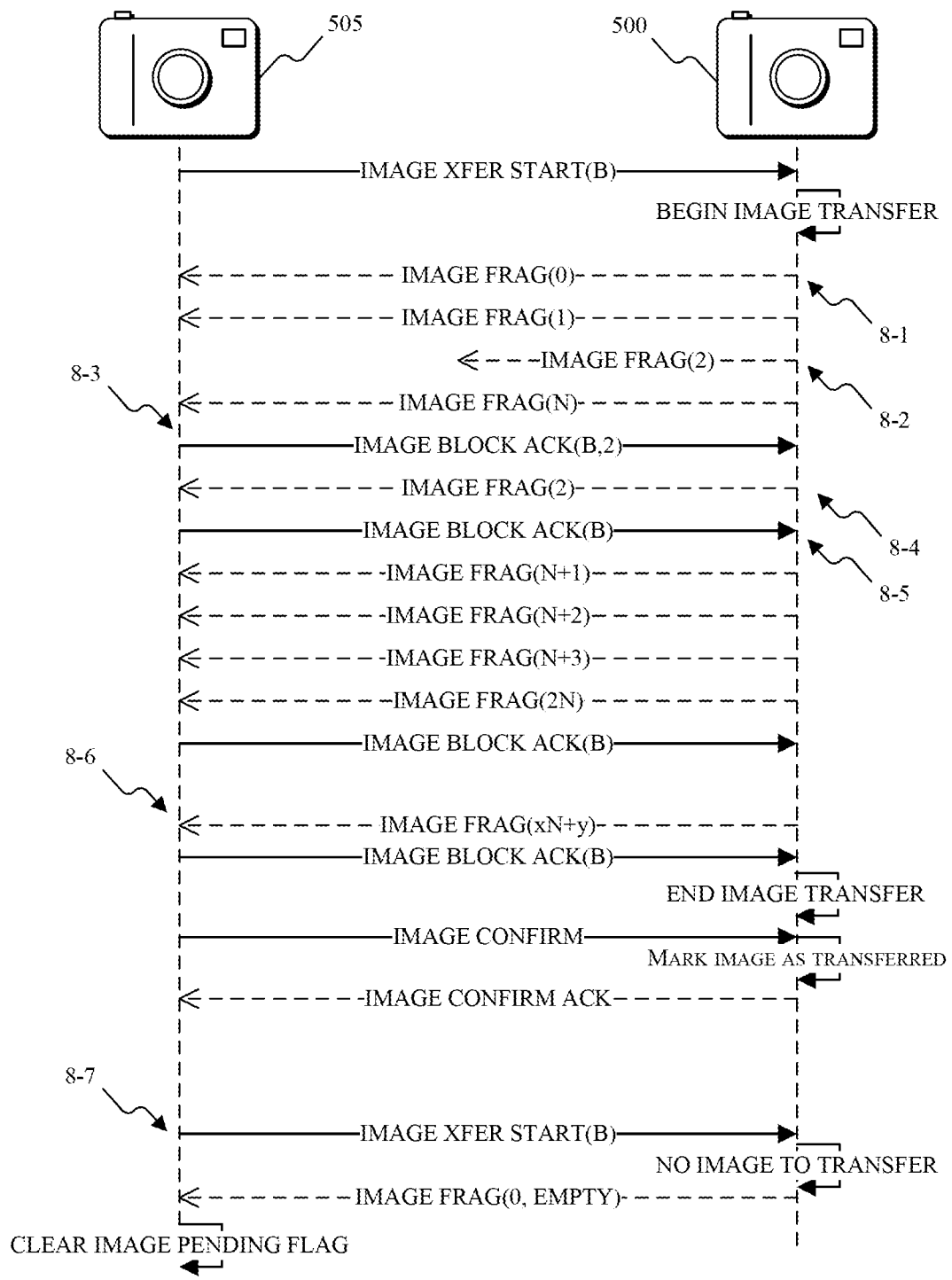
FIG. 8 illustrates messages transmitted between a HOME node and a REMOTE node to transfer an image between the HOME node and the REMOTE node according to an embodiment of the invention.

The steps associated with transferring an image from the REMOTE node 500 to the HOME node 505 and the messages that are transmitted between the HOME node 505 and the REMOTE node 500 are provided in FIG. 8. The image transfer includes the following steps:

Step 8-1: The first image fragment includes the image length embedded within it.

Step 8-2: This image fragment is lost.

Step 8-3: The HOME node acknowledges the image block and indicates that fragment 2 should be retransmitted. The HOME node can request any and multiple of the image fragments in an image block to be retransmitted.

Step 8-4: The REMOTE node resends fragment 2.

Step 8-5: All image fragments in the image block were received by the HOME node and transmission of the next image block begins.

Step 8-6: The HOME node knows the image length (in fragment 0) and determines that this is the last image fragment.

Step 8-7: If there are other REMOTE nodes indicating pending image transfers, then the HOME node transfers images in a round robin fashion. If not, the HOME node keeps sending image transfer start messages until a REMOTE node sends an empty first image fragment.

Transfer of Image from Camera Module to Rf Module

Figure 9:
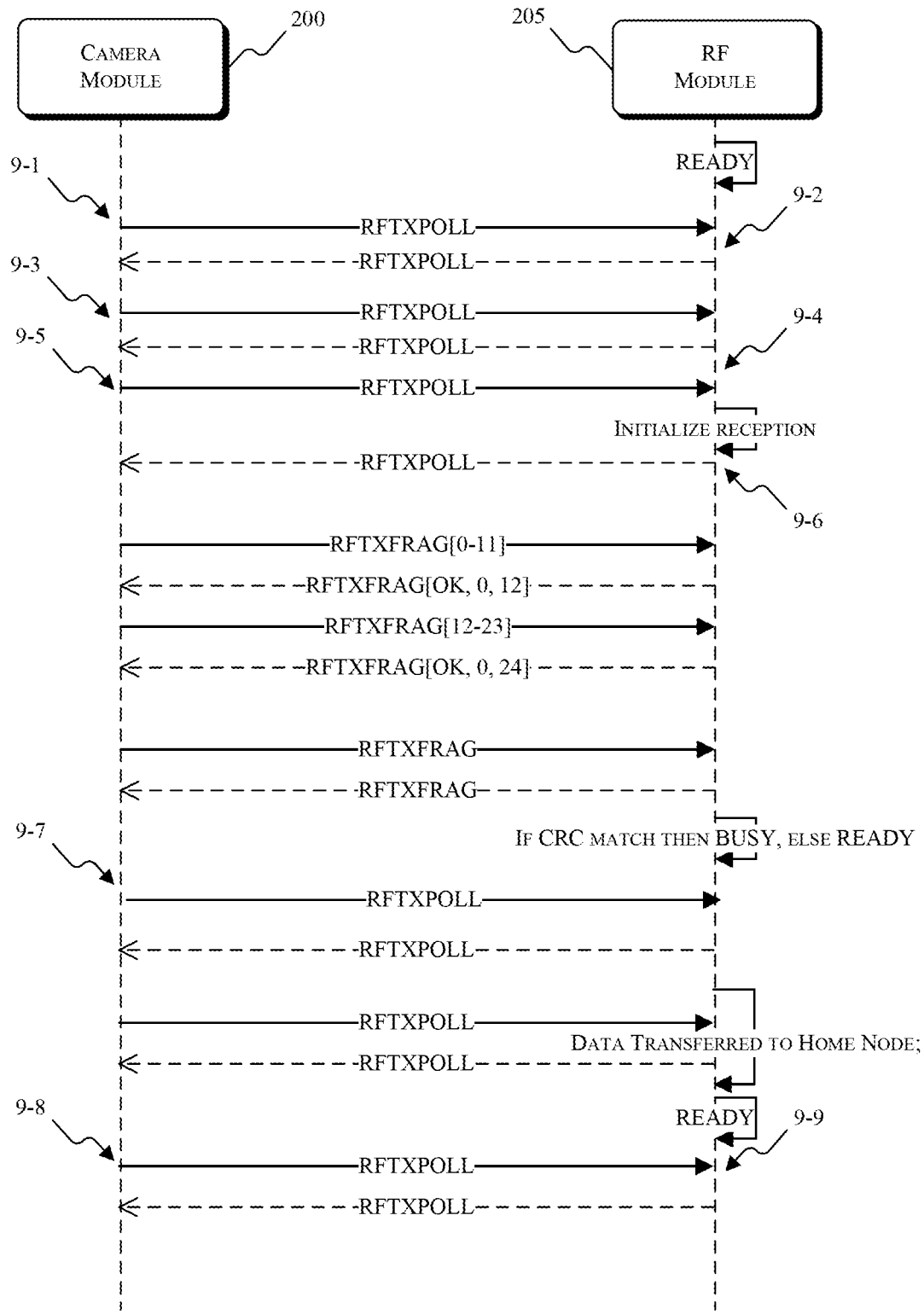
FIG. 9 illustrates messages transmitted between a camera module and an RF module to transfer an image between the camera module and the RF module according to an embodiment of the invention.

The steps associated with transferring an image from the camera module 200 to the RF module 205 and the messages that are transmitted between the camera module 200 and the RF module 205 are provided in FIG. 9. The image transfer includes the following steps:

Step 9-1: The camera module polls the RF module to determine if it is ready to receive a new image.

Step 9-2: The RF module returns that it is ready for data transfer, and that there were no prior data transfers recorded.

Step 9-3: If the RF module is ready, the camera module enters a wake state and polls the RF module again to check if previous data has been successfully transferred to the HOME node.

Step 9-4: If there is an image ready for transfer to the RF module, the camera module polls the RF module with a cyclical redundancy check ("CRC") and size of the data (e.g., image). If the camera module does not have an image ready, the camera module stops polling the RF module.

Step 9-5: This command is not sent during image fragment transfer because it would reset the reception Step 9-6: The RF module prepares to receive data and clears any information regarding previous transfers.

Step 9-7: The camera module is done transferring the image and begins polling the RF module again. If the RF module reports busy, then the data has not yet been successfully transferred to the HOME node.

Step 9-8: The camera module determines that the RF module is ready and polls the RF module again to confirm that the data was transferred and the image can be marked read or deleted.

Step 9-9: After the image is transferred to the HOME node, the RF module indicates that it is ready to receive a new image and the CRC of the data is transferred. The camera module can mark the data as transferred.

Transfer of Image from Rf Module to Camera Module

Figure 10:
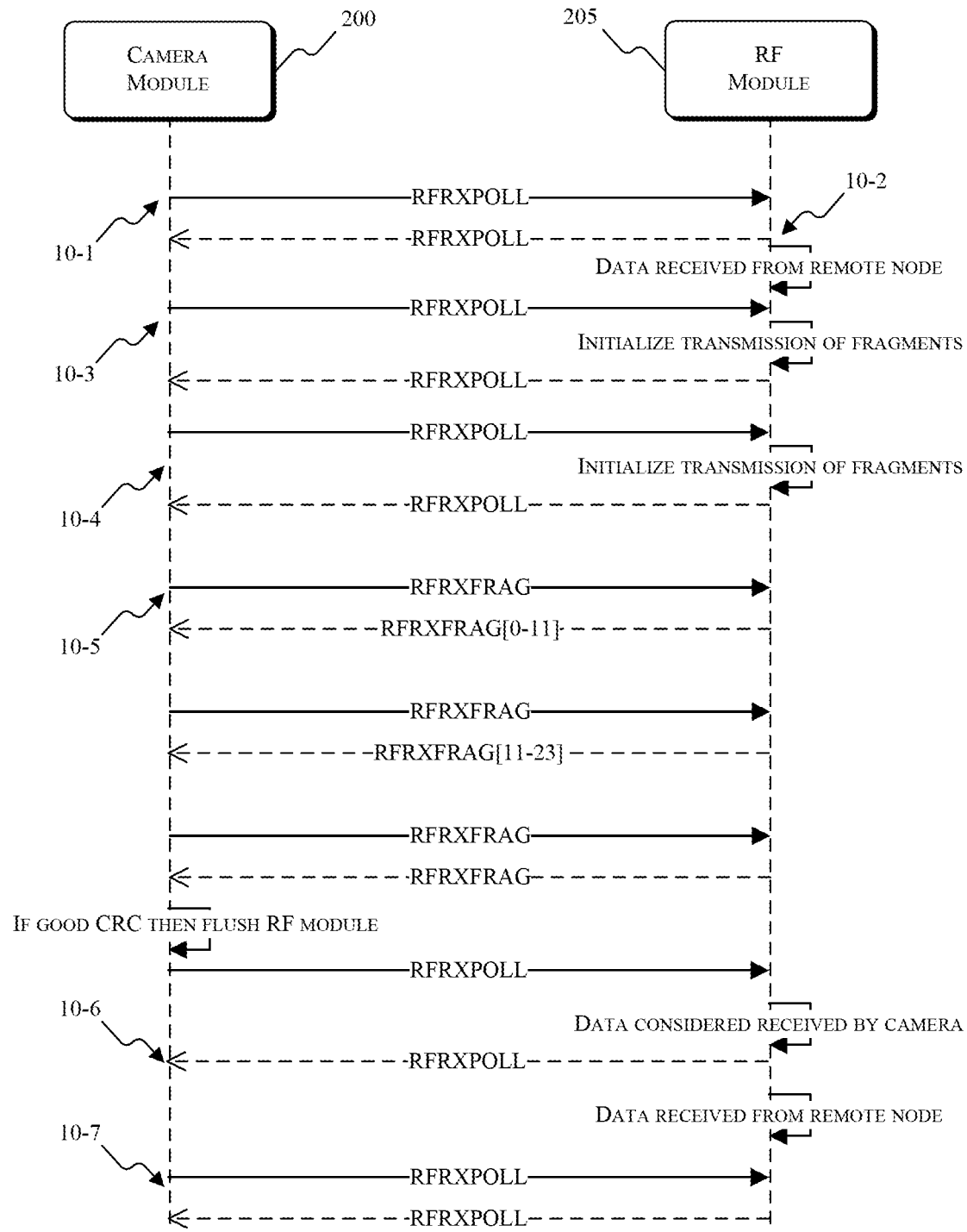
FIG. 10 illustrates messages transmitted between an RF module and a camera module to transfer an image between the RF module and the camera module according to an embodiment of the invention.

The steps associated with transferring an image from the RF module 205 to the camera module 200 and the messages that are transmitted between the camera module 200 and the RF module 205 are provided in FIG. 10. The image transfer includes the following steps:

Step 10-1: The camera module polls the RF module to determine if data is pending to be received.

Step 10-2: The RF module reports that there is no data ready.

Step 10-3: The camera module polls the RF module to determine if data is pending to be received. There is data to be received and the camera module enters a wake state.

Step 10-4: The camera module polls the RF module to receive the CRC and size of the data to be transferred.

Step 10-5: The camera module receives image fragments from the RF module.

Step 10-6: The camera module flushes the RF module and again begins polling the RF module.

Step 10-7: The camera module polls the RF module to determine if data is pending to be received. There is data to be received and the camera module enters a wake state.

Binning of Network Messages

Figure 11:
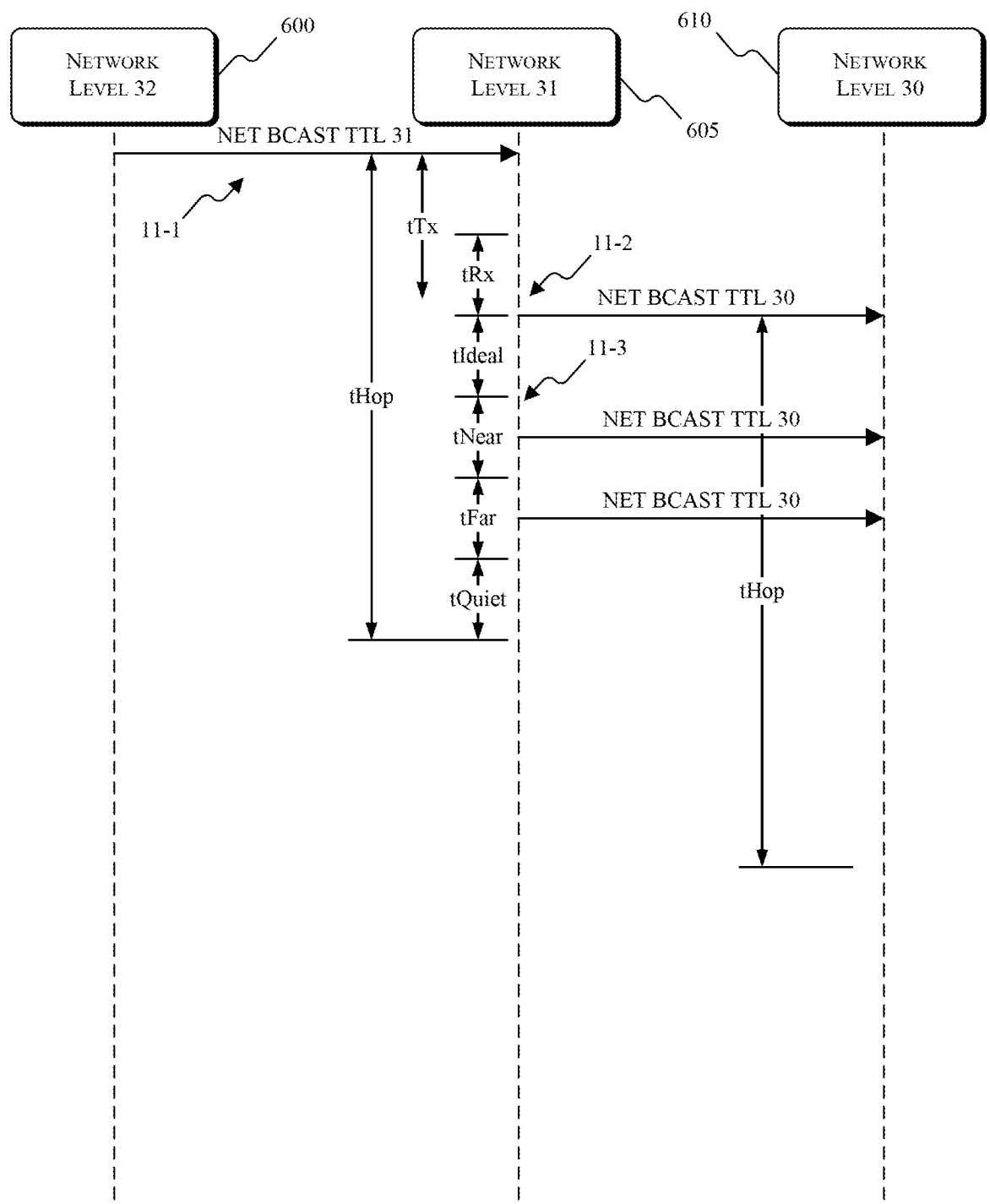
FIG. 11 illustrates messages transmitted between a HOME node and one or more REMOTE nodes and the manner in which the messages are binned according to an embodiment of the invention.

The steps associated with binning network messages are provided in FIG. 11 and includes:

Step 11-1: The broadcast source node (e.g., the HOME node) transmits a packet that must traverse the network 130.

Step 11-2: Three REMOTE nodes at network level 31 receive the broadcasted message.

Step 11-3: Based on the RSSI of the received message, each of the three nodes bins the retransmission of the message into an ideal window, a near window, and a far window. Within each of the windows, the rebroadcast of the message is randomized. The binning of the message favors nodes that are a good distance away from the broadcast source node that have a reliable signal to rebroadcast first. This allows the message to propagate efficiently through the network 130.

Binning of network messages is used to determine the best probability of successfully message transmission, and occurs each time a broadcast message is received. The binning of messages into ideal, near, and far windows allows for an optimized network path for messages to be determined. For example, a first node may be very close to a second node and, therefore, the RSSI of a message received at the second node from the first node is very high. However, a second node that has a slightly lower RSSI, but an RSSI that is still in the ideal window, may propagate the message a greater distance while still ensuring a high probability of a successful transmission. When a node is selected for message retransmission based on binning, multiple squelch signals can be transmitted to prevent further, unnecessary transmission of the message. Once a path (e.g., from the HOME node to a particular REMOTE node) is set, the efficiency of message transmission in terms of both time (propagation delay) and power (removing unnecessary transmissions) is optimized. Broadcast messages can also be throttled to prevent interference and improve RSSI for messages transmitted between nodes.

Figure 12:
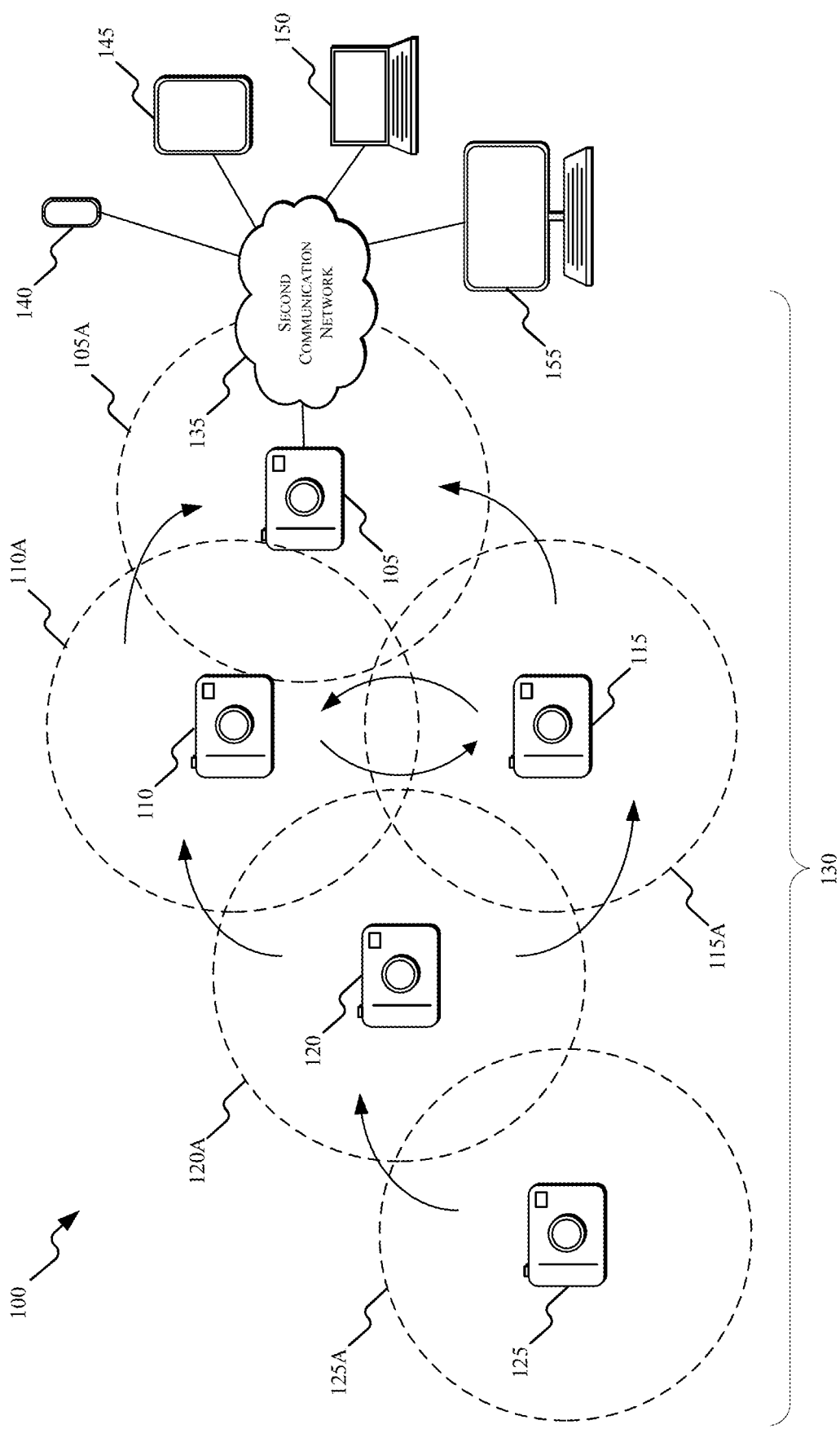
FIG. 12 illustrates the upstream transmission of messages through a mesh network according to an embodiment of the invention.
Figure 13:
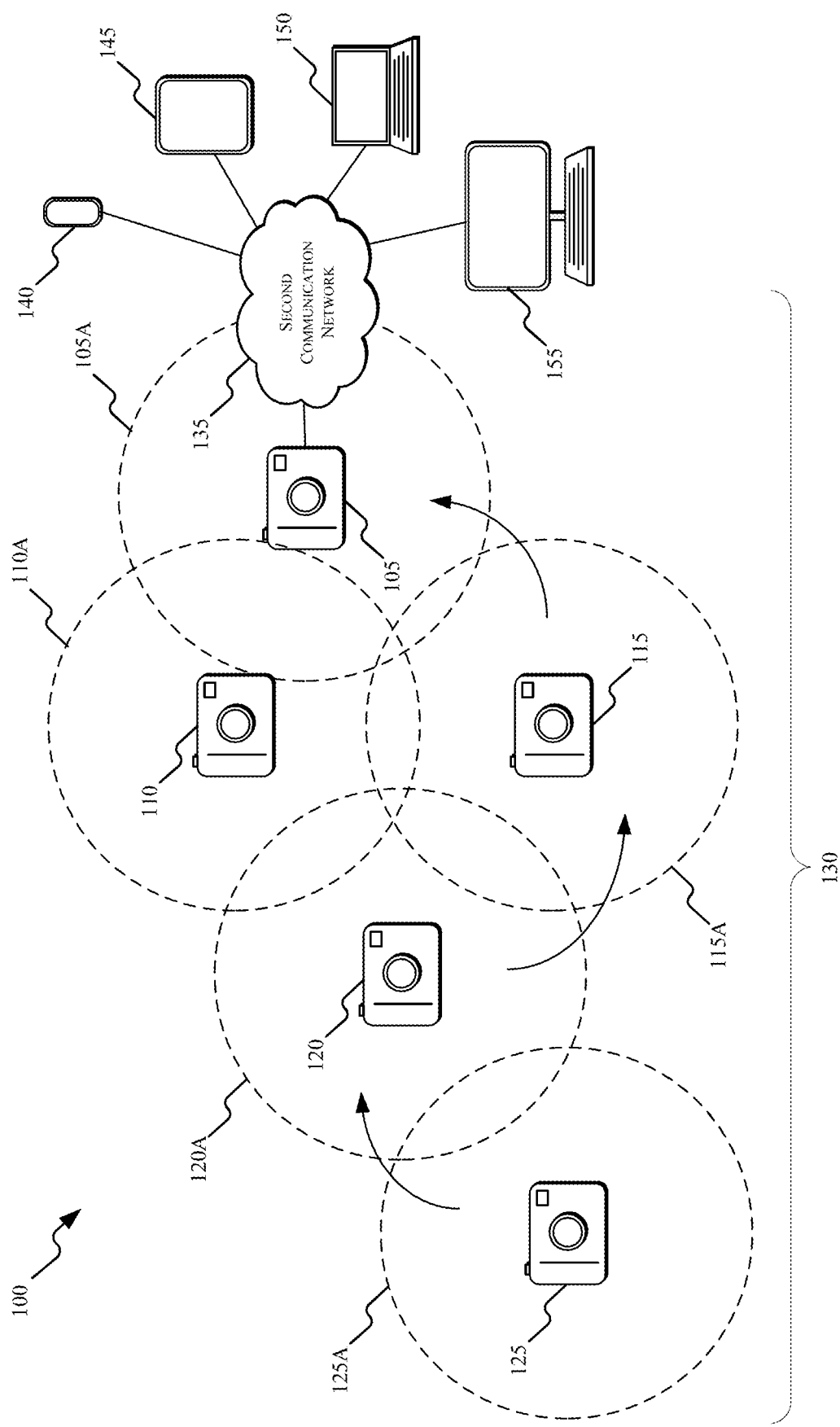
FIG. 13 illustrates the upstream transmission of messages through a mesh network after squelching according to an embodiment of the invention.
Figure 14:
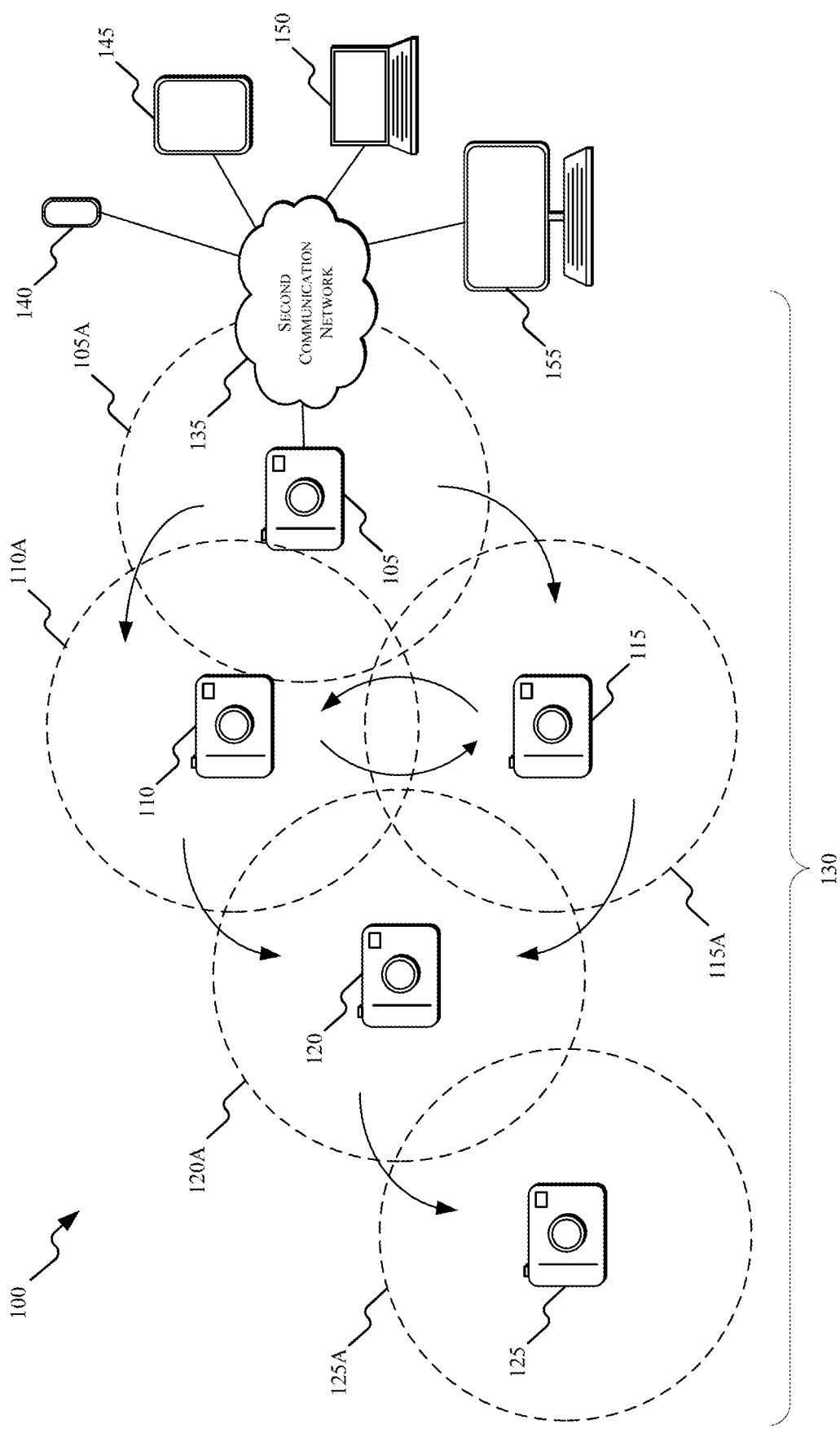
FIG. 14 illustrates the downstream transmission of messages through a mesh network according to an embodiment of the invention.
Figure 15:
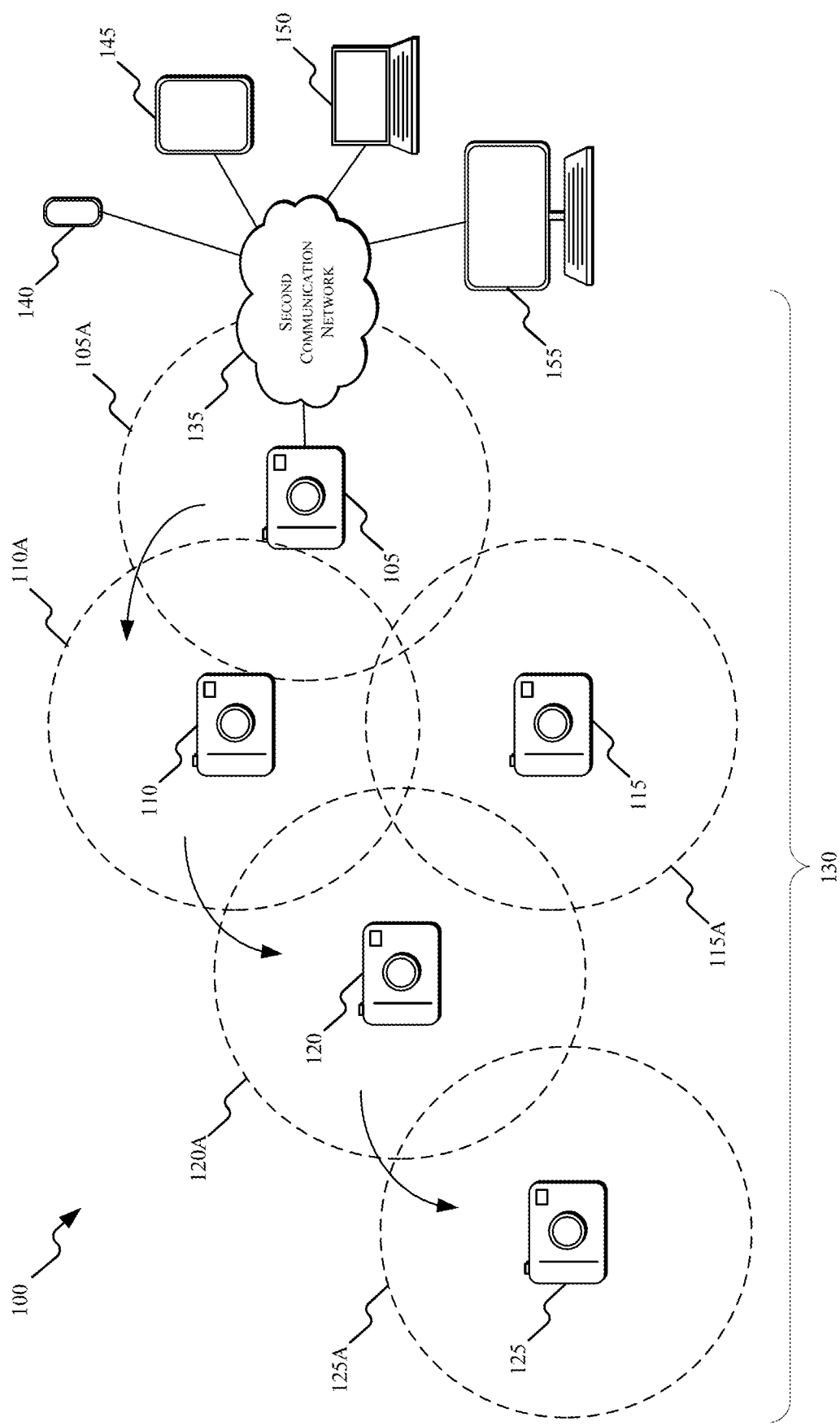
FIG. 15 illustrates the downstream transmission of messages through a mesh network after squelching according to an embodiment of the invention.

FIGS. 12-15 illustrate the effect of binning and transmission path optimization from a high (network) level. For example, FIG. 12 illustrates a message (arrows) being transmitted from REMOTE node 125 back to the HOME node 105. The message is retransmitted from each node to each node that is within transmission range. As illustrated, there are a number of unnecessary transmissions that can be eliminated for the sake of saving power. In this instance, assume that the RSSI of a message from REMOTE node 120 that is received by REMOTE nodes 110 and 115 is in the ideal window for REMOTE node 115 and the near window for REMOTE node 110. Based on this, REMOTE node 115 can squelch further transmissions of the message through the network 130 such that the message from REMOTE node 120 is only received and processed by the REMOTE node 115, and the message is then only retransmitted by REMOTE node 115. In some embodiments, the node 110 still receives the message from node 120, but upon seeing that the destination was REMOTE node 115, the message is ignored. The optimized transmission path for the message from the REMOTE node 125 to the HOME node 105 is illustrated in FIG. 13. As illustrated in FIG. 13, four retransmissions of the message were eliminated. A similar optimization technique is illustrated in FIGS. 14 and 15 for a message transmitted from the HOME node 105 to the REMOTE node 125.

Thus, the invention provides, among other things, a low-power RF network for transmitting images from a plurality of remote cameras (i.e., REMOTE nodes) to a centralized location (i.e., HOME node). Various features and advantages of the invention are set forth in the following claims.

What is claimed is:

1. A system of cameras configured to transmit images through a first network or a second network, the system comprising:
   a first camera including:
      a first camera module including a first sensor and a first camera memory module, the first sensor configured to capture an image of an environment, the first camera memory module configured to store the captured image; and
      a first radio frequency ("RF") module configured to operate in a network sleep mode or a network wake mode, the first RF module connected to the first camera module and configured to communicate over the first network, the first RF module including a first RF memory module,
   wherein, when the first RF module is in the network sleep mode:
      the first camera module is programmed to send a first signal to the first RF module to determine if the first RF module is ready to receive the captured image, the first RF module is programmed to respond to the first signal with a second signal indicating that the first RF module is ready to receive the captured image, and the first camera module is programmed to transfer the captured image to the first RF module, and wherein, when the first RF module is in the network wake mode:

the first RF module is programmed to transmit the captured image through the first network; and a second camera including:

a second camera module including a second sensor and a second camera memory module; and a second RF module configured to operate in a network sleep mode or a network wake mode, the second RF module connected to the second camera module and configured to communicate over the first network, the second RF module including a second RF memory module, wherein, when the second RF module is in the network wake mode:

the second RF module is programmed to:

receive the captured image from the first RF module through the first network, store the captured image in the second RF memory module, and transmit the captured image through the second network.

2. The system of claim 1, wherein the first RF module is further programmed to provide an indication to the first camera module that:

the captured image was successfully transmitted through the first network, and the first RF memory module is able to receive a new captured image from the first camera module when the first RF module is in the network sleep mode.

3. The system of claim 1, further comprising:

a third camera including:

a third camera module including a third sensor and a third camera memory module, and a third RF module configured to operate in a network sleep mode or a network wake mode, the third RF module connected to the third camera module and configured to communicate over the first network, the third RF module including a third RF memory module, wherein, when the third RF module is in the network wake mode:

the third RF module is programmed to:

receive the captured image from the first RF module through the first network, store the captured image in the third RF memory module, and transmit the captured image through the first network.

4. The system of claim 3, wherein the third RF module is further programmed to:

transmit a registration request to the second RF module, and receive a registration identification ("ID") to register with the first network.

5. The system of claim 4, wherein the first RF module is further programmed to:

transmit a squelch message to the third RF module to stop the third RF module from transmitting the captured image through the first network.

6. The system of claim 4, wherein the third RF module is further programmed to:

evaluate a received signal strength indicator of the captured image by binning the received signal strength indicator into a bin according to a likelihood of a successful propagation of the captured image within the first network.

7. The system of claim 3, wherein each of the first RF module, the second RF module, and the third RF module is programmed to:

enter the network wake mode at a preset time based on a synchronization message from the third RF module.

8. The system of claim 1, wherein the first network is a short-range communication network.

9. The system of claim 8, wherein the second network is a wide area network.

10. The system of claim 9, wherein the wide area network is a cellular network.

11. A camera operable to transmit an image through a network, the camera comprising:

a camera module including a sensor and a camera memory module, the sensor configured to capture an image of an environment, the camera memory module configured to store the captured image; and a radio frequency ("RF") module configured to operate in a network sleep mode or a network wake mode, the RF module connected to the camera module and configured to communicate over the network, the RF module including an RF memory module, wherein, when the RF module is in the network sleep mode:

the camera module is programmed to send a first signal to the RF module to determine if the RF module is ready to receive the captured image, the RF module is programmed to respond to the first signal with a second signal indicating that the RF module is ready to receive the captured image, and the camera module is programmed to transfer the captured image to the RF module, and wherein, when the RF module is in the network wake mode:

the RF module is programmed to transmit the captured image through the network.

12. The camera of claim 11, wherein the network is a short-range communication network.

13. The camera of claim 12, wherein:

when the RF module is in the network wake mode, the RF module is programmed to:

receive a second captured image through the network, store the second captured image in the RF memory module, and transmit the second captured image over a second network.

14. The camera of claim 12, wherein:

when the RF module is in the network wake mode, the RF module is programmed to:

transmit the captured image over a second network.

15. The camera of claim 14, wherein the second network is a wide area network.

16. The camera of claim 15, wherein the wide area network is a cellular network.

17. The camera of claim 12, wherein the RF module is further programmed to:

receive a second captured image through the network, and evaluate a received signal strength indicator of the second captured image by binning the received signal strength indicator into a bin according to a likelihood of a successful propagation of the second captured image within the network.

18. The camera of claim 12, wherein the RF module is programmed to transmit the captured image through the network as a plurality of image fragments.

19. The camera of claim 12, wherein:
when the RF module is in the network sleep mode, the RF module is programmed to:
transmit a heartbeat message through the network.

20. The camera of claim 12, wherein the first RF module is further programmed to:
transmit a squelch message through the network to stop a second camera from transmitting the captured image through the first network.

* * * * *